United States Patent
Luo et al.

(10) Patent No.: US 11,863,324 B2
(45) Date of Patent: Jan. 2, 2024

(54) REPETITION TRANSMISSIONS WITH OVERLAPPING RESOURCES

(71) Applicant: QUALCOMM Incorporated, San Diego, CA (US)

(72) Inventors: Jianghong Luo, Skillman, NJ (US); Navid Abedini, Basking Ridge, NJ (US); Naeem Akl, Somerville, NJ (US); Karl Georg Hampel, Hoboken, NJ (US); Luca Blessent, Whitehouse Station, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 17/471,088

(22) Filed: Sep. 9, 2021

(65) Prior Publication Data

US 2022/0085918 A1 Mar. 17, 2022

Related U.S. Application Data

(60) Provisional application No. 63/077,499, filed on Sep. 11, 2020.

(51) Int. Cl.
*H04L 1/18* (2023.01)
*H04L 5/00* (2006.01)
*H04W 28/086* (2023.01)

(52) U.S. Cl.
CPC .............. *H04L 1/18* (2013.01); *H04L 5/0055* (2013.01); *H04W 28/0864* (2023.05)

(58) Field of Classification Search
None
See application file for complete search history.

(56) References Cited

U.S. PATENT DOCUMENTS

2011/0211551 A1* 9/2011 Parkvall ................ H04L 5/0053
370/330
2019/0230683 A1 7/2019 Akkarakaran et al.
(Continued)

OTHER PUBLICATIONS

CEWIT: "Discussions on Resource Multiplexing Among Backhaul and Access Links", 3GPP TSG RAN WG1 Meeting #98bis, 3GPP Draft; 3rd Generation Partnership Project (3GPP), RAN WG1, No. Chongqing, CN; Oct. 14, 2019-Oct. 20, 2019, Oct. 5, 2019 (Oct.5, 2019), 10 Pages, XP051808884, URL: https://www.3gpp.org/ftp/tsg_ran/WG1_RL1/TSGR1_98b/Docs/R1-1911237.zip, R1-1911237/R1-1911237 Resource AllocationIAB.docx—[retrieved on Oct. 5, 2019], Sections 3 and 4, the whole document.
(Continued)

*Primary Examiner* — Daniel F. McMahon
(74) *Attorney, Agent, or Firm* — Procopio, Cory, Hargreaves & Savitch LLP

(57) ABSTRACT

Aspects presented herein relate to methods and devices for wireless communication including an apparatus, e.g., a node or a base station. In one aspect, the apparatus may receive, via a first set of resources, communication including at least one data packet, the first set of resources allocated for a reception entity of the node. The apparatus may also decode, at the reception entity, the at least one data packet during a decoding period, the decoding period including a decoding start time and a decoding completion time. Additionally, the apparatus may transmit, via a second set of resources, the communication including the at least one data packet to a next hop node, the second set of resources allocated for a forwarding entity of the node, at least one first resource overlapping with at least one second resource.

30 Claims, 20 Drawing Sheets

(56) References Cited

U.S. PATENT DOCUMENTS

| | | |
|---|---|---|
| 2019/0327061 A1 | 10/2019 | Li et al. |
| 2019/0364492 A1* | 11/2019 | Azizi ................ H04W 36/0009 |
| 2020/0007223 A1* | 1/2020 | Zhu ...................... H04W 16/26 |
| 2020/0107356 A1 | 4/2020 | Rico Alvarino et al. |
| 2021/0127318 A1* | 4/2021 | Zhang ................ H04W 40/248 |
| 2022/0038164 A1* | 2/2022 | Wei ...................... H04W 88/14 |
| 2022/0085918 A1* | 3/2022 | Luo ...................... H04L 1/1819 |
| 2023/0164620 A1* | 5/2023 | Lee ...................... H04W 40/12 |
| | | 370/329 |

OTHER PUBLICATIONS

International Search Report and Written Opinion—PCT/US2021/049951—ISA/EPO—dated Dec. 3, 2021.

* cited by examiner

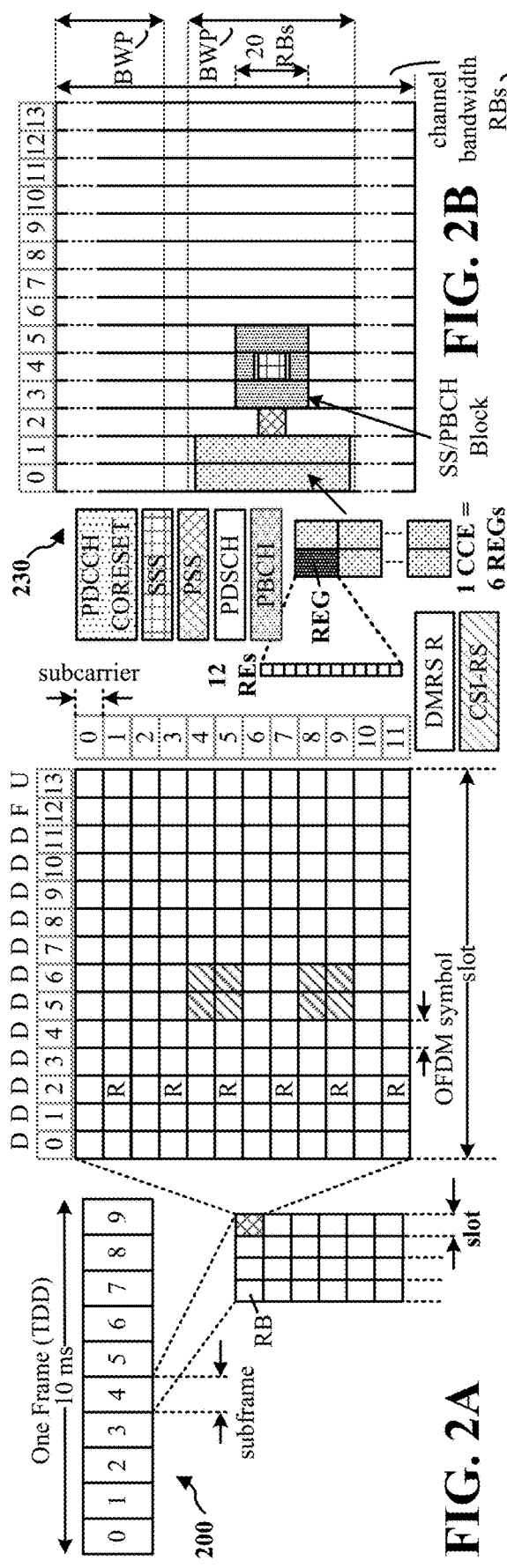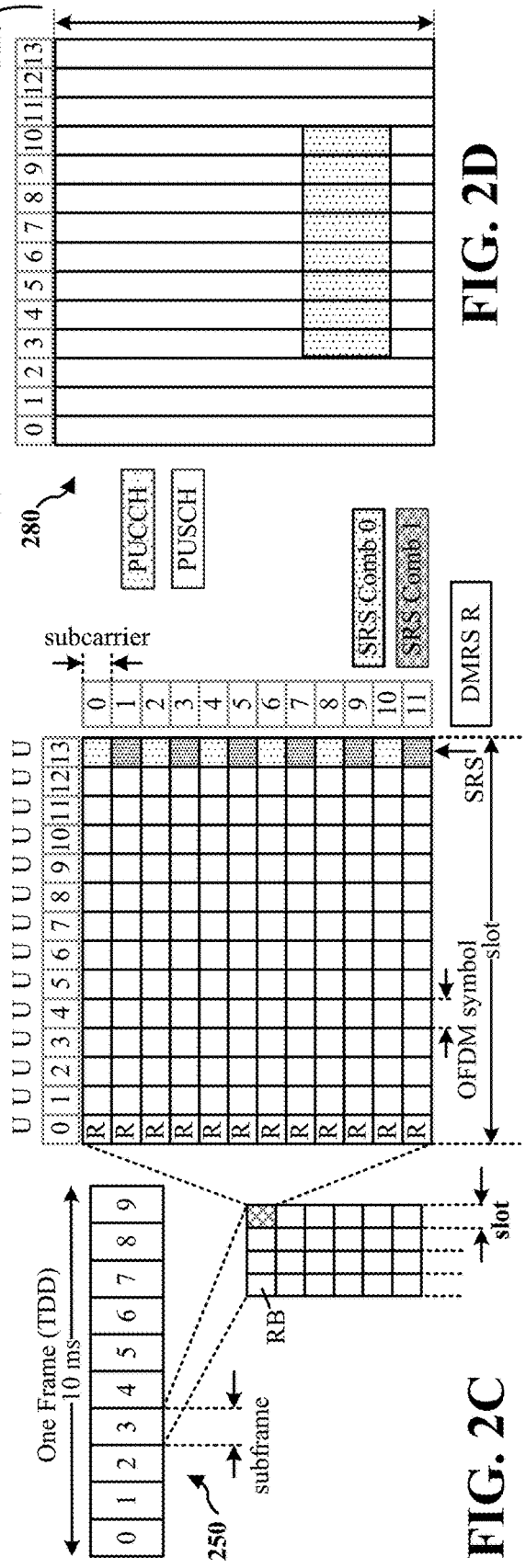
FIG. 2A  FIG. 2B  FIG. 2C  FIG. 2D

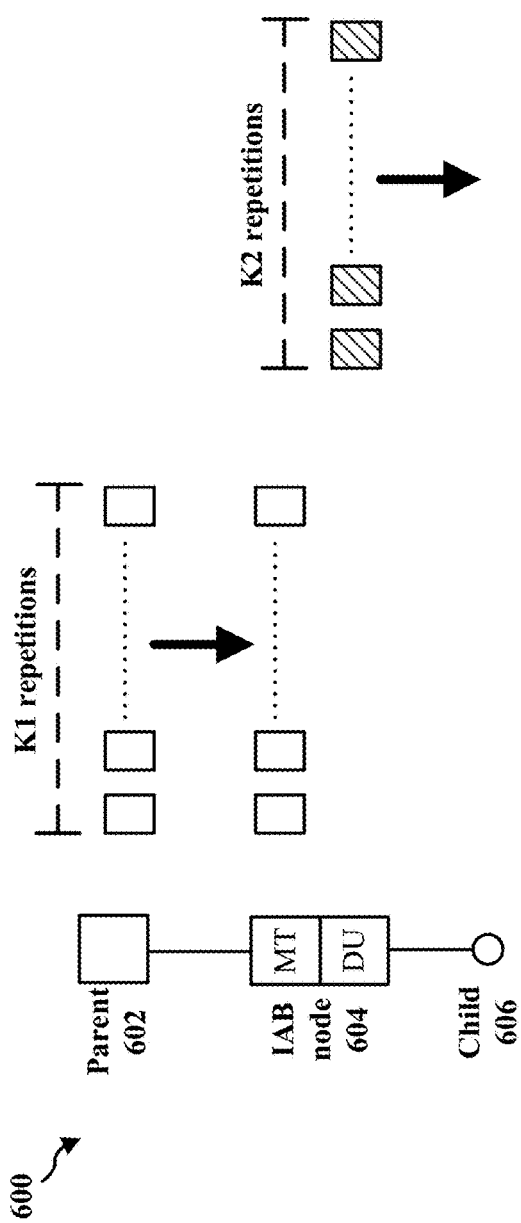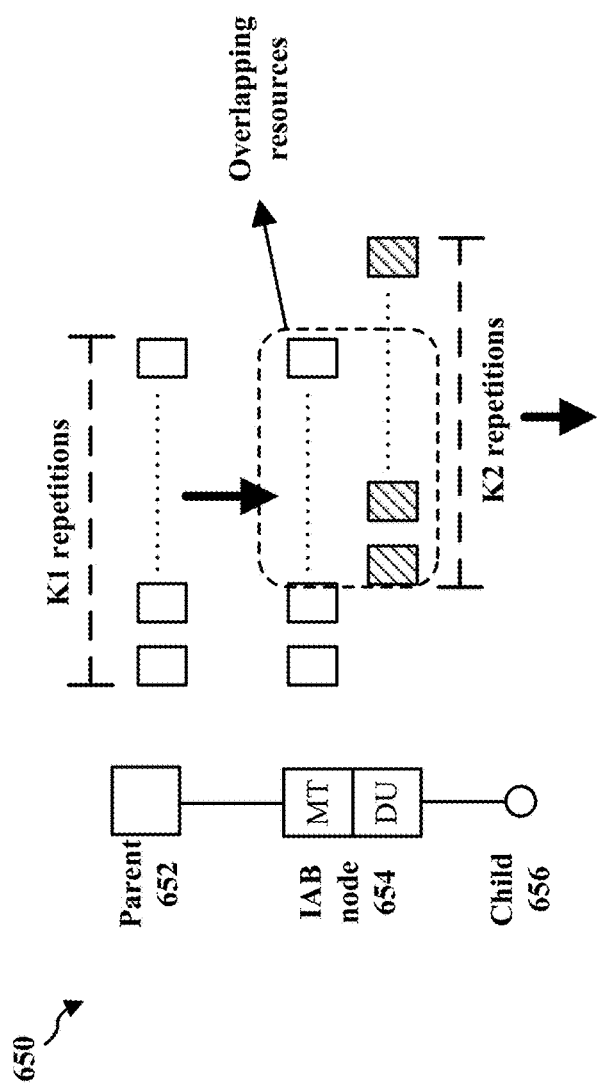

REPETITION TRANSMISSIONS WITH OVERLAPPING RESOURCES

CROSS REFERENCE TO RELATED APPLICATION(S)

This application claims the benefit of and priority to U.S. Provisional Application Ser. No. 63/077,499, entitled "METHODS AND APPARATUS FOR REPETITION TRANSMISSIONS WITH OVERLAPPING RESOURCES" and filed on Sep. 11, 2020, which is expressly incorporated by reference herein in its entirety.

TECHNICAL FIELD

The present disclosure relates generally to communication systems, and more particularly, to repetition transmissions in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced (pc)mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a node or a base station. The apparatus may receive, via a first set of UL or DL resources, UL or DL communication including at least one data packet, the first set of UL or DL resources allocated for a reception entity of the node. The apparatus may also decode, at the reception entity, the at least one data packet during a decoding period, the decoding period including a decoding start time and a decoding completion time. Additionally, the apparatus may transmit an acknowledgement (ACK) or negative ACK (NACK) upon decoding the at least one data packet at the reception entity of the node. The apparatus may also stop reception of at least one remaining first repetition unit of the one or more first repetition units upon successfully decoding the at least one data packet, where the reception of the at least one remaining first repetition unit is stopped at an early termination instance. Further, the apparatus may encode the at least one data packet at the forwarding entity of the node, the at least one data packet being transmitted to the next hop node via the one or more second repetition units after the at least one data packet is encoded, where the one or more second repetition units overlap with the at least one remaining first repetition unit. The apparatus may also transmit, via a second set of UL or DL resources, the UL or DL communication including the at least one data packet to a next hop node, the second set of UL or DL resources allocated for a forwarding entity of the node, at least one first resource of the first set of UL or DL resources overlapping with at least one second resource of the second set of UL or DL resources. The apparatus may receive, from a last hop node, a notification flag indicating one or more potentially skipped resources, the one or more potentially skipped resources being skipped by the last hop node at a beginning of a first set of uplink (UL) or downlink (DL) resources, where a received UL or DL communication is based on the notification flag. In some examples, the notification flag may be initiated or generated by a last hop node. In some examples, the notification flag may be initiated by a central unit (CU) of the network and be delivered to the apparatus via a last hop node. The apparatus may also transmit, to the next hop node, a notification flag indicating one or more potentially skipped resources, the one or more potentially skipped resources being skipped by the forwarding entity at a beginning of the second set of UL or DL resources.

In another aspect of the disclosure, a method, a computer-readable medium, and an apparatus are provided. The apparatus may be a node or a base station. The apparatus may transmit, to a second node via a first set of uplink (UL) or downlink (DL) resources, UL or DL communication including at least one data packet, the first set of UL or DL resources allocated for a reception entity of the second node. The apparatus may also receive, from the second node, an acknowledgement (ACK) or negative ACK (NACK) based on the at least one data packet being decoded at the reception entity of the second node. The apparatus may also transmit, to the second node, a notification flag indicating one or more potentially skipped resources, the one or more potentially skipped resources being skipped by the first node at a beginning of the first set of UL or DL resources, where the transmitted UL or DL communication is based on the notification flag.

In another aspect of the disclosure, a method, a computer-readable medium, and an apparatus are provided. The apparatus may be a node or a base station. The apparatus may receive, from a second node, a notification flag indicating one or more potentially skipped resources, the one or more potentially skipped resources being skipped by a forwarding entity of the second node at a beginning of a first set of uplink (UL) or downlink (DL) resources. The apparatus may also receive, from the second node via the first set of UL or DL resources, the UL or DL communication including at least one data packet, the first set of UL or DL resources allocated for the forwarding entity of the second node, where at least one second resource of a second set of UL or DL resources overlaps with at least one first resource of the first set of UL or DL resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 6A is a diagram illustrating an example repetition transmission.

FIG. 6B is a diagram illustrating an example repetition transmission

DETAILED DESCRIPTION

Figure 1:
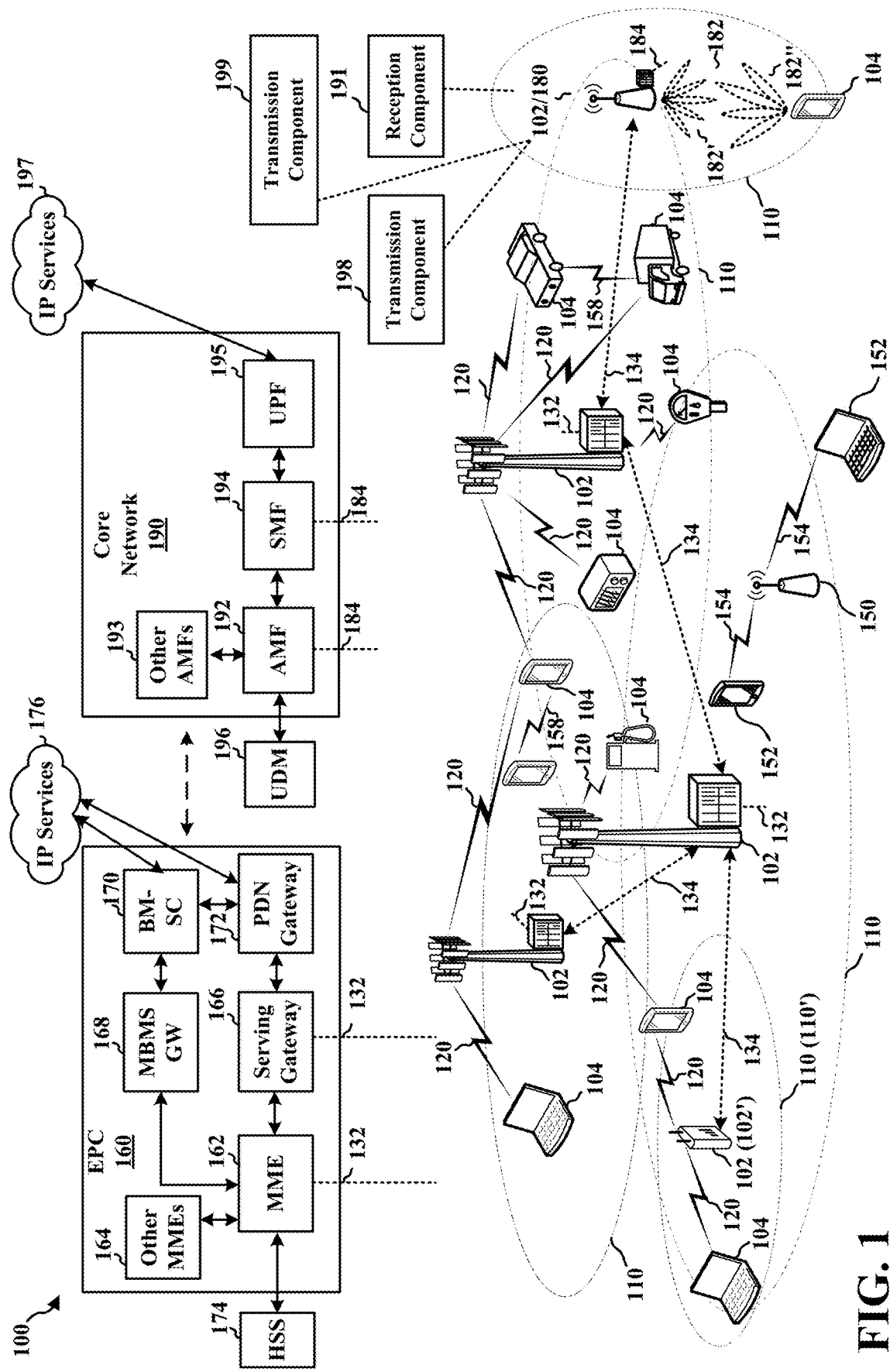
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include a transmission component 199 configured to receive, from a last hop node, a notification flag indicating one or more potentially skipped resources, the one or more potentially skipped resources being skipped by the last hop node at a beginning of a first set of uplink (UL) or downlink (DL) resources, where a received UL or DL communication is based on the notification flag. Transmission component 199 may also be configured to receive, via a first set of UL or DL resources, UL or DL communication including at least one data packet, the first set of UL or DL resources allocated for a reception entity of the node. Transmission component 199 may also be configured to decode, at the reception entity, the at least one data packet during a decoding period, the decoding period including a decoding start time and a decoding completion time. Transmission component 199 may also be configured to transmit an acknowledgement (ACK) or negative ACK (NACK) upon decoding the at least one data packet at the reception entity of the node. Transmission component 199 may also be configured to stop reception of at least one remaining first repetition unit of the one or more first repetition units upon successfully decoding the at least one data packet, where the reception of the at least one remaining first repetition unit is stopped at an early termination instance. Transmission component 199 may also be configured to transmit, to the next hop node, a notification flag indicating one or more potentially skipped resources, the one or more potentially skipped resources being skipped by the forwarding entity at a beginning of the second set of UL or DL resources. Transmission component 199 may also be configured to encode the at least one data packet at the forwarding entity of the node, the at least one data packet being transmitted to the next hop node via the one or more second repetition units after the at least one data packet is encoded, where the one or more second repetition units overlap with the at least one remaining first repetition unit. Transmission component 199 may also be configured to transmit, via a second set of UL or DL resources, the UL or DL communication including the at least one data packet to a next hop node, the second set of UL or DL resources allocated for a forwarding entity of the node, at least one first resource of the first set of UL or DL resources overlapping with at least one second resource of the second set of UL or DL resources.

Referring again to FIG. 1, in certain aspects, the base station 180 may include a transmission component 198 configured to transmit, to a second node via a first set of uplink (UL) or downlink (DL) resources, UL or DL communication including at least one data packet, the first set of UL or DL resources allocated for a reception entity of the second node. Transmission component 198 may also be configured to receive, from the second node, an acknowledgement (ACK) or negative ACK (NACK) based on the at least one data packet being decoded at the reception entity of the second node. Transmission component 198 may also be configured to transmit, to the second node, a notification flag indicating one or more potentially skipped resources, the one or more potentially skipped resources being skipped by the first node at a beginning of the first set of UL or DL resources, where the transmitted UL or DL communication is based on the notification flag.

Referring again to FIG. 1, in certain aspects, the base station 180 may include a reception component 191 configured to receive, from a second node, a notification flag indicating one or more potentially skipped resources, the one or more potentially skipped resources being skipped by a forwarding entity of the second node at a beginning of a first set of uplink (UL) or downlink (DL) resources. Reception component 191 may also be configured to receive, from the second node via the first set of UL or DL resources, the UL or DL communication including at least one data packet, the first set of UL or DL resources allocated for the forwarding entity of the second node, where at least one second resource of a second set of UL or DL resources overlaps with at least one first resource of the first set of UL or DL resources.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
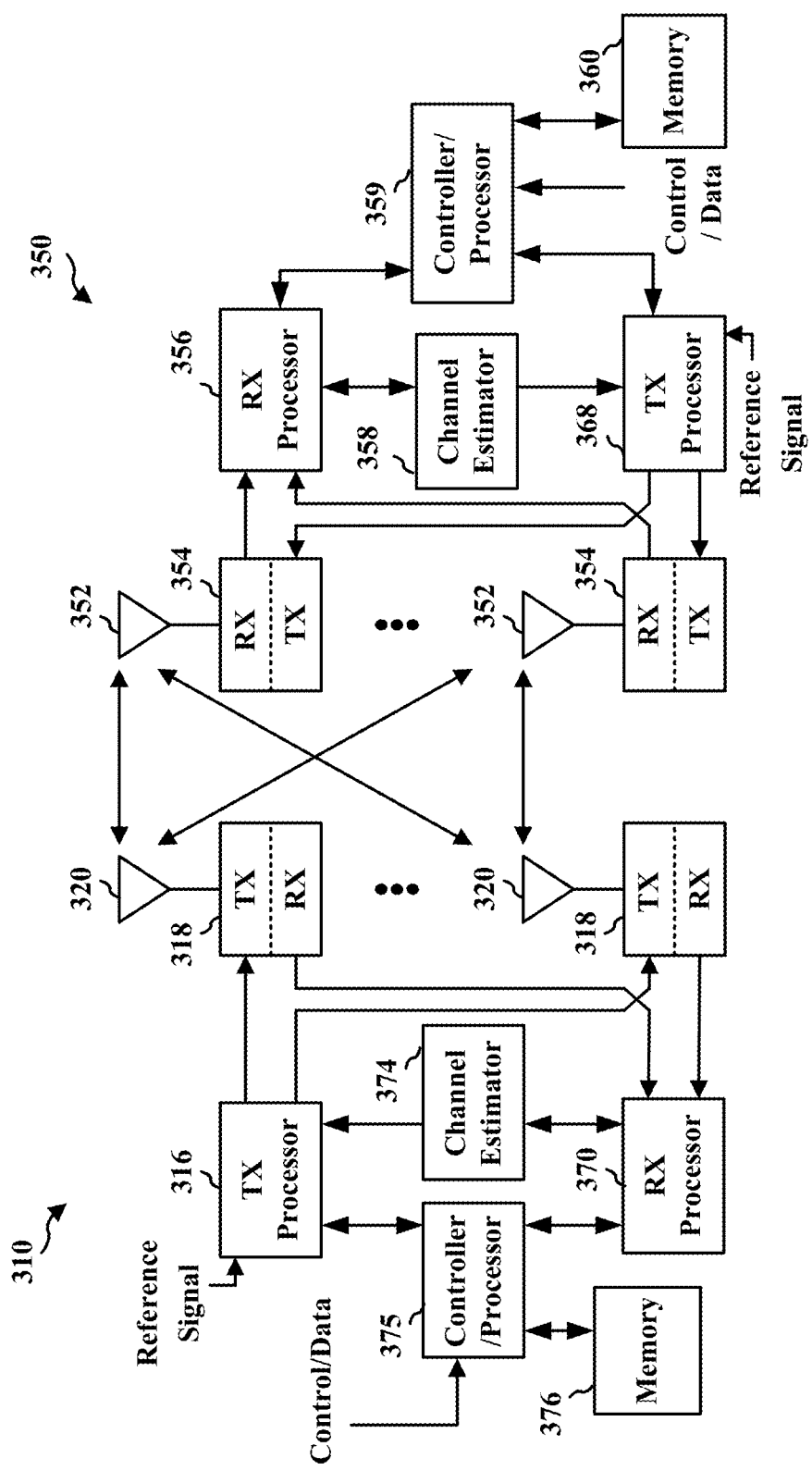
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 191, 198, and/or 199 of FIG. 1.

Some aspects of wireless communication may include an integrated access and backhaul (IAB) network. In IAB networks, a portion of the wireless spectrum may be utilized for a backhaul connection of nodes or base stations. This utilization of the wireless spectrum may be used in place of another type of connection, e.g., a fiber connection. IAB networks may be beneficial as they have the ability to make high density deployments of wireless networks more economically viable. Based on this, some aspects of wireless communications are increasingly utilizing multiple hop (multi-hop) IAB networks.

IAB networks may include a number of different nodes or base stations, such as an IAB donor and an IAB node. An IAB donor is an enhanced base station node with functions to control the IAB network. IAB donors may include a central unit (CU), which is the central entity that controls the entire IAB network through a configuration. Additionally, the CU may include a number of functions, e.g., radio resource control (RRC) protocol or packet data convergence protocol (PDCP) layer functions. IAB donors may also include a distributed unit (DU), which is a scheduling node that may schedule child nodes of the IAB donor. The DU may also include a number of functions, e.g., radio link control (RLC), medium access control (MAC), and/or physical (PHY) layer functions.

An IAB node may be a layer 2 (L2) relay node that includes a number of functions, e.g., mobile-termination (MT) unit and DU functions. In some aspects, the MT of an IAB node may be a scheduled node similar to a UE. Moreover, the MT may be scheduled by its parent IAB node or an IAB donor. Further, the DU may be a scheduling node that schedules child nodes of the IAB node.

Figure 4:
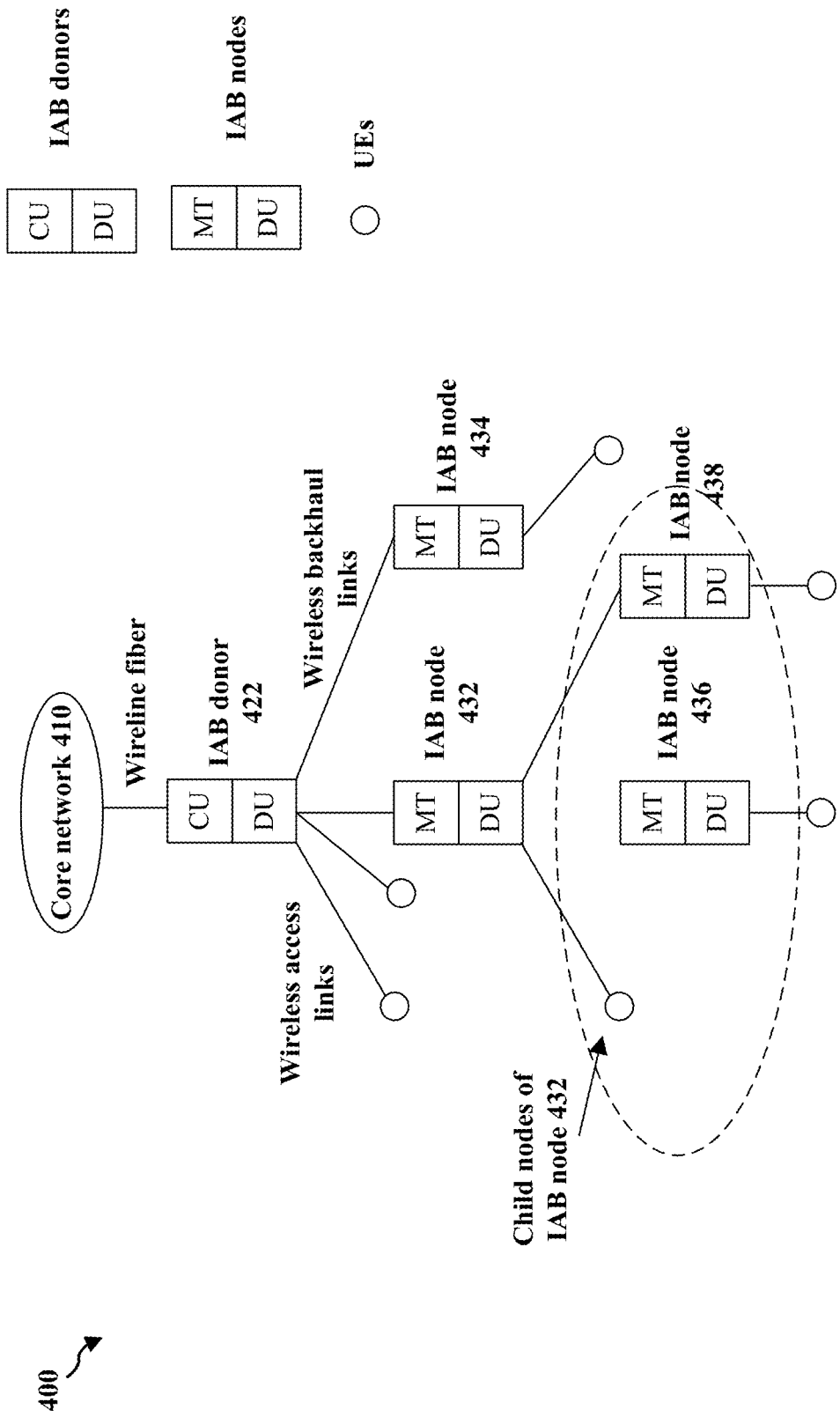
FIG. 4 is a diagram illustrating an example integrated access and backhaul (IAB) network.

FIG. 4 is a diagram 400 illustrating an example IAB network. As shown in FIG. 4, diagram 400 includes core network 410, IAB donor 422, and IAB nodes 432/434/436/438. FIG. 4 also illustrates a number of UEs, child nodes of IAB node 432, wireless access links, and wireless backhaul links. As mentioned above, IAB donor 422 includes a CU and a DU. Additionally, IAB nodes 432/434/436/438 include an MT and a DU.

Some aspects of IAB networks may include resource management solutions to handle different constraints, e.g., a half-duplex constraint. A half-duplex constraint is a node that cannot perform transmission (TX) and reception (RX) functions at the same time over a same frequency band. One solution to a half-duplex constraint may be time division multiplexing (TDM), as well as space division multiplexing (SDM) TX, frequency division multiplexing (FDM) TX, SDM RX, or FDM RX.

Figures 5A, 5B:
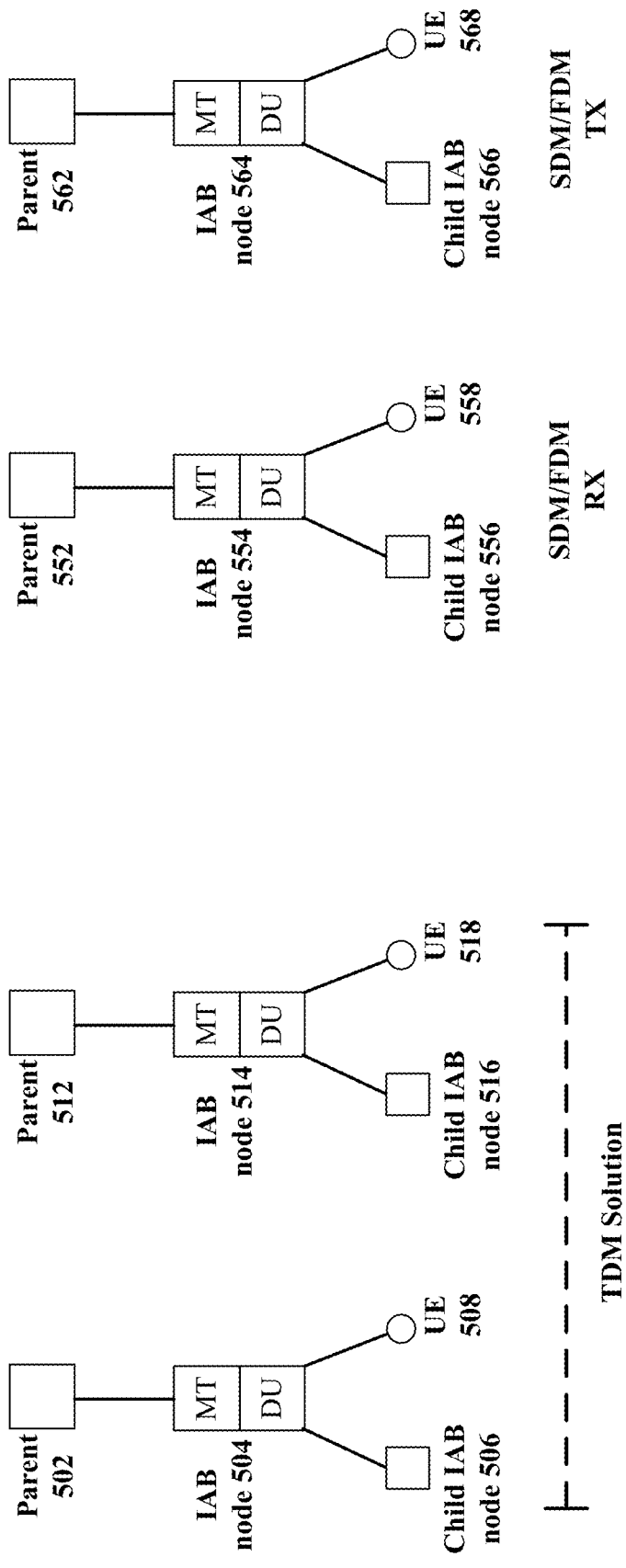
FIG. 5A is a diagram illustrating an example node.
FIG. 5B is a diagram illustrating an example node.

FIGS. 5A and 5B are diagrams 500 and 550, respectively, illustrating example nodes. As shown in FIG. 5A, diagram 500 includes parent nodes 502/512, IAB nodes 504/514, child IAB nodes 506/516, and UEs 508/518. FIG. 5A displays one example of a TDM solution between different nodes. As shown in FIG. 5B, diagram 550 includes parent nodes 552/562, IAB nodes 554/564, child IAB nodes 556/566, and UEs 558/568. FIG. 5B displays one example of SDM RX or FDM RX solutions between different nodes, as well as SDM TX or FDM TX solutions between different nodes.

IAB nodes may include a number of DU resource attributes, such as hard (H) resources, not available (NA) resources, and soft (S) resources. A DU may use an H resource unconditionally, but it does not have to use the H resource. The DU may not use an NA resource, with an exception if the DU matches an allocation for a number of cell-specific signals or channels. For example, an exception may apply to synchronization signal block (SSB) transmission (both cell-defining SSB (CD-SSB) and non-CD-SSB), RACH receptions, periodic CSI-RS transmissions, and SR receptions. The DU may use an S resource if a condition is satisfied or true. For example, these conditions may include an explicit indication, i.e., where the parent node sends an indication to release the resource, an implicit determination, i.e., where the node determines that the use of the DU resource has no impact on what the MT is expected to do, and the same exception as the NA case above for cell-specific signals or channels.

Some aspects of wireless communications, e.g., 5G NR communication, may include a number of repetition schemes. For instance, the repetition schemes may include slot aggregation or multiple transmission-reception point (TRP) or multi-TRP TDM repetition. In slot aggregation, a single DCI may schedule a PDSCH or PUSCH that may span multiple consecutive slots, e.g., N slots. In some instances, a same set of symbols over the N slots may be used for data transmission. Also, a number of aggregated slots may be semi-statically configured via RRC signaling, e.g., a pdsch-AggregationFactor parameter in a PDSCH configuration (pdsch-config). In one case, based on a TDD slot configuration, a UE may determine that the allocated symbol(s) to receive a PDSCH (or transmit a PUSCH) is UL (or DL), and determine that there is no transmission in a slot.

In multi-TRP TDM repetition, aspects of wireless communications may include support for slot or mini-slot repetition. Multi-TRP TDM repetition may also include TCI state or a redundancy version (RV) pattern cross repetitions. Additionally, multi-TRP TDM repetition may include a dynamic indication of a number of repetitions via DCI, e.g., a time domain resource assignment. In some instances, the DCI may point to an entry in an RRC configured table (e.g., a PDSCH-TimeDomainResourceAllocation parameter). Also, a RepNumR16 parameter for multi-TRP repetition may be part of a configuration for the PDSCH-TimeDomainResourceAllocation parameter.

Additionally, some aspects of wireless communications may include a work item description (WID) for IAB networks. For instance, IAB networks may include a number of enhancements, such as topology, routing, and transport enhancements. IAB networks may also include specifications of enhancements, such as to improve topology-wide fairness, multi-hop latency, and/or congestion mitigation.

FIGS. 6A and 6B are diagrams 600 and 650, respectively, illustrating example repetition transmissions. FIGS. 6A and 6B display that aspects of wireless communications may include repetition with non-overlapping resources and overlapping resources across IAB networks. As shown in FIG. 6A, diagram 600 includes parent node 602, IAB node 604, and child node 606. FIG. 6A also includes a number of repetition resources. For instance, the repetition resources corresponding to the MT of IAB node 604 are white in FIG. 6A, which include K1 repetitions. The repetition resources corresponding to the DU of IAB node 604 have diagonal lines in FIG. 6A, which include K2 repetitions. FIG. 6A depicts repetition with non-overlapping resources across an IAB MT of IAB node 604 and an IAB DU of IAB node 604.

As shown in FIG. 6B, diagram 650 includes parent node 652, IAB node 654, and child node 656. FIG. 6B depicts repetition with overlapping resources across an IAB MT of IAB node 654 and an IAB DU of IAB node 654. FIG. 6B also includes a number of repetition resources. For instance, the repetition resources corresponding to the MT of IAB node 654 are white in FIG. 6B, which include K1 repetitions. The repetition resources corresponding to the DU of IAB node 654 have diagonal lines in FIG. 6B, which include K2 repetitions. FIG. 6B also depicts there are a number of overlapping repetition resources. As indicated in FIG. 6B, repetition with overlapping resources may include improved latency over a multi-hop IAB network. Additionally, a repetition scheme may refer to slot aggregation or multi-TRP TDM repetition.

Based on the above, it may be beneficial to include repetition transmissions with overlapping resources across an IAB node. For instance, repetition with overlapping resources may provide a number of enhancements, such as a latency enhancement. Accordingly, it may be beneficial to include repetition with overlapping resources across an IAB MT and an IAB DU to improve latency issues.

Aspects of the present disclosure may include repetition transmissions with overlapping resources across an IAB node. For instance, aspects of the present disclosure may utilize repetition with overlapping resources in order to provide a number of enhancements, such as a latency enhancement. Aspects of the present disclosure may also include repetition with overlapping resources across an IAB MT and an IAB DU to optimize latency issues.

Figure 7:
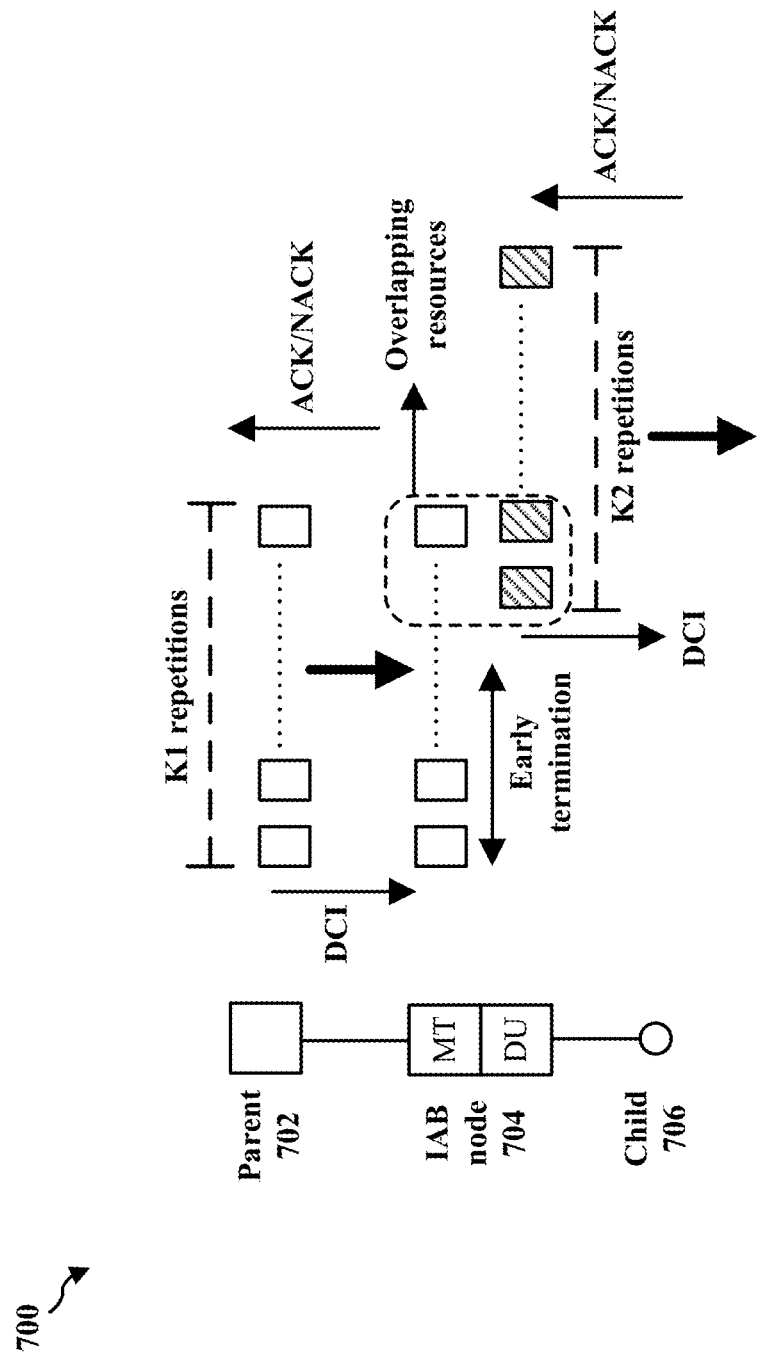
FIG. 7 is a diagram illustrating an example repetition transmission.

FIG. 7 is a diagram 700 illustrating an example repetition transmission. As shown in FIG. 7, diagram 700 includes parent node 702, IAB node 704, and child node 706. FIG. 7 depicts repetition with overlapping resources across an IAB MT of IAB node 704 and an IAB DU of IAB node 704. FIG. 7 includes a number of repetition resources corresponding to the MT and the DU. For instance, the repetition resources corresponding to the MT of IAB node 704 are white in FIG. 7, which include K1 repetitions. The repetition resources corresponding to the DU of IAB node 704 have diagonal lines in FIG. 7, which include K2 repetitions. FIG. 7 also depicts there are a number of overlapping resources of the repetition resources. Further, FIG. 7 includes an early termination instance, as well as DCI and ACK/NACKs.

As shown in FIG. 7, some aspects of the present disclosure may be aware of an early termination instance at a scheduling time. In some instances, overlapping resources allocated for a next hop may start after an early termination instance of this hop. As illustrated in FIG. 7, a DL repetition TX may be transmitted via dynamic DCI, where an IAB DU (e.g., a forwarding entity) may perform dynamic scheduling for a next hop upon knowledge of an early termination at a co-located IAB MT (e.g., a reception entity).

Figure 8:
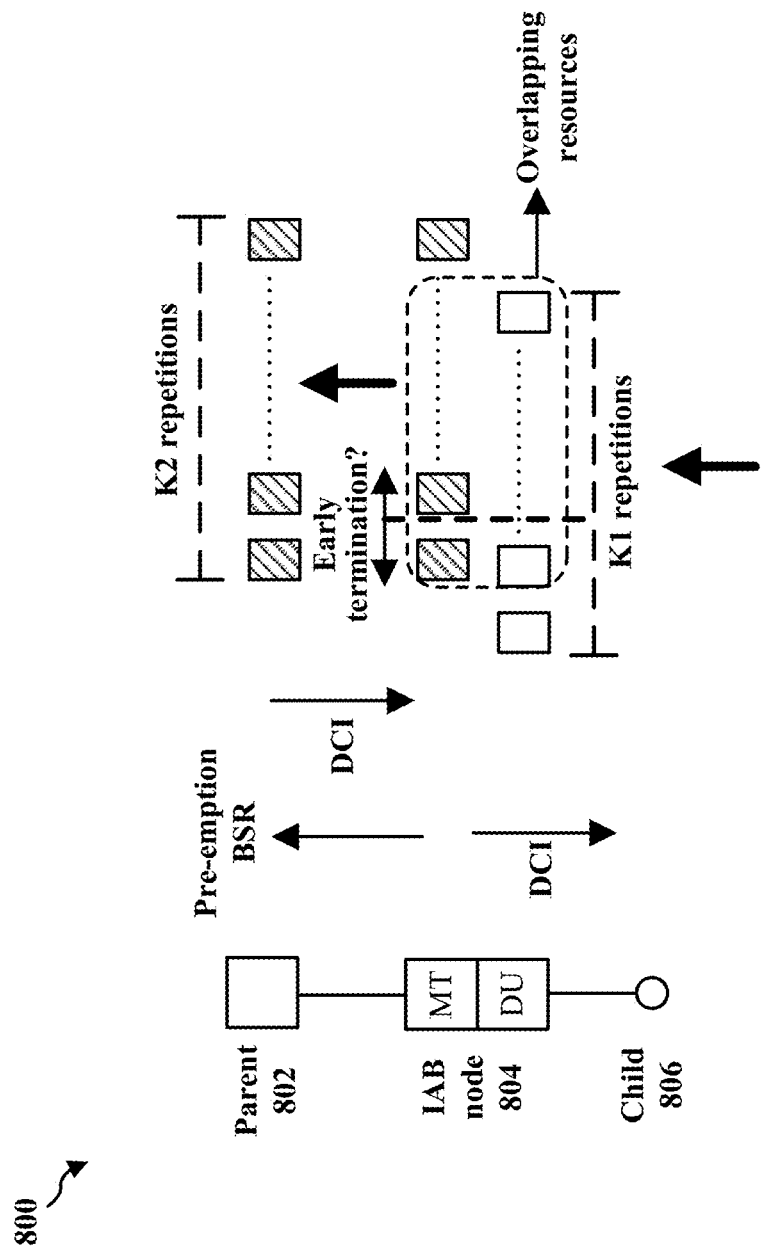
FIG. 8 is a diagram illustrating an example repetition transmission.

FIG. 8 is a diagram 800 illustrating an example repetition transmission. As shown in FIG. 8, diagram 800 includes parent node 802, IAB node 804, and child node 806. FIG. 8 depicts repetition with overlapping resources across an IAB MT of IAB node 804 and an IAB DU of IAB node 804. FIG. 8 includes a number of repetition resources corresponding to the MT and the DU. For instance, the repetition resources corresponding to the DU of IAB node 804 are white in FIG. 8, which include K1 repetitions. The repetition resources corresponding to the MT of IAB node 804 have diagonal lines in FIG. 8, which include K2 repetitions. FIG. 8 also depicts there are a number of overlapping resources of the repetition resources. Moreover, FIG. 8 includes an early termination instance, as well as DCI and a pre-emption buffer status report (BSR).

As shown in FIG. 8, some aspects of the present disclosure may not be aware of an early termination instance at a scheduling time. In some aspects, overlapping resources allocated for a next hop may start before an early termination instance of this hop. As illustrated in FIG. 8, an UL repetition TX may be transmitted via dynamic DCI, where a parent DU is the scheduling node for a next hop TX by an IAB MT (e.g., a forwarding entity). The scheduling node may not know the early termination instance at an IAB DU (e.g., a reception entity).

Figures 9A, 9B:
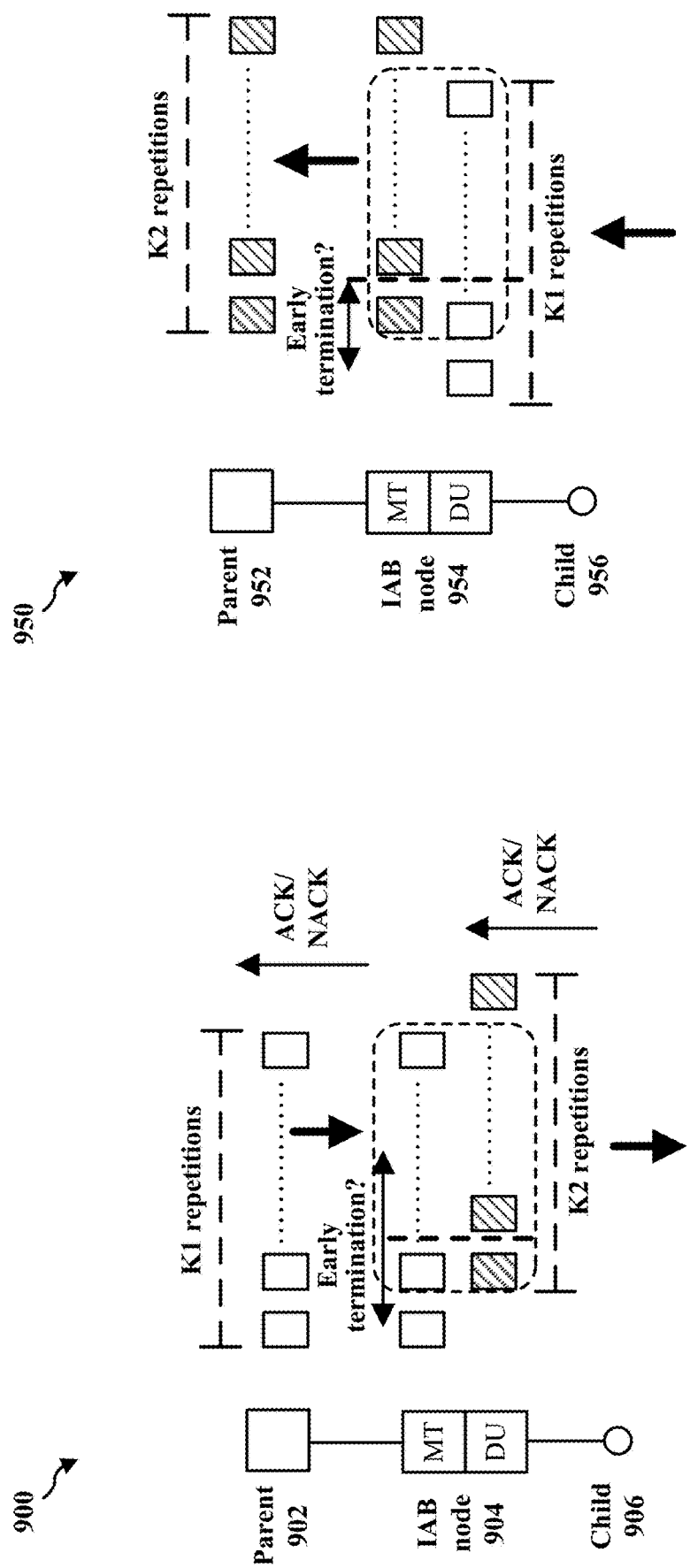
FIG. 9A is a diagram illustrating an example repetition transmission.
FIG. 9B is a diagram illustrating an example repetition transmission.

FIGS. 9A and 9B are diagrams 900 and 950, respectively, illustrating example repetition transmissions. As shown in FIG. 9A, diagram 900 includes parent node 902, IAB node 904, and child node 906. FIG. 9A depicts repetition with overlapping resources across an IAB MT of IAB node 904 and an IAB DU of IAB node 904. FIG. 9A includes a number of repetition resources corresponding to the MT and the DU. For instance, the repetition resources corresponding to the MT of IAB node 904 are white in FIG. 9A, which include K1 repetitions. The repetition resources corresponding to the DU of IAB node 904 have diagonal lines in FIG. 9A, which include K2 repetitions. FIG. 9A also depicts there are a number of overlapping resources of the repetition resources. FIG. 9A also includes an early termination instance and ACK/NACKs. FIG. 9A depicts that aspects of the present disclosure may correspond to DL semi-persistent scheduling (SPS).

As shown in FIG. 9B, diagram 950 includes parent node 952, IAB node 954, and child node 956. FIG. 9B also depicts repetition with overlapping resources across an IAB MT of IAB node 954 and an IAB DU of IAB node 954. FIG. 9B includes a number of repetition resources corresponding to the MT and the DU. For instance, the repetition resources corresponding to the DU of IAB node 904 are white in FIG. 9B, which include K1 repetitions. The repetition resources corresponding to the MT of IAB node 954 have diagonal lines in FIG. 9B, which include K2 repetitions. FIG. 9B also depicts there are a number of overlapping resources of the repetition resources, as well as an early termination instance. FIG. 9B depicts that aspects of the present disclosure may correspond to an UL configured grant with repetition.

As shown in FIGS. 9A and 9B, examples of the present disclosure may correspond to DL SPS and/or an UL configured grant with repetition. For these cases, resources may be periodically allocated beforehand via activation DCI or by RRC configuration. The starting resource for a forwarding entity may be determined based on an earliest possible successful decoding time at a reception entity. The actual successful decoding time at the reception entity may occur after the starting time of the allocated resources for the forwarding entity.

Figure 10:
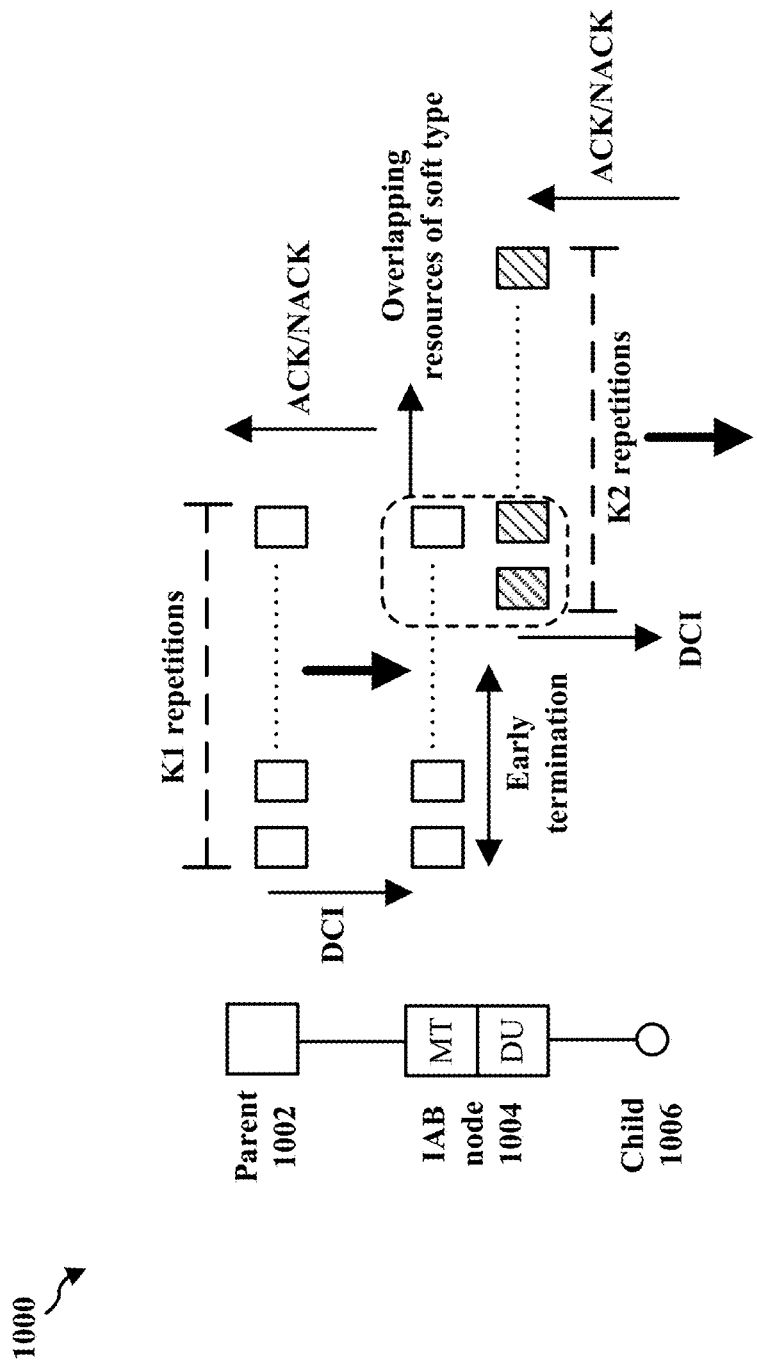
FIG. 10 is a diagram illustrating an example repetition transmission.

FIG. 10 is a diagram 1000 illustrating an example repetition transmission. As shown in FIG. 10, diagram 1000 includes parent node 1002, IAB node 1004, and child node 1006. FIG. 10 depicts repetition with overlapping resources across an IAB MT of IAB node 1004 and an IAB DU of IAB node 1004. FIG. 10 includes a number of repetition resources corresponding to the MT and the DU. For instance, the repetition resources corresponding to the MT of IAB node 1004 are white in FIG. 10, which include K1 repetitions. The repetition resources corresponding to the DU of IAB node 1004 have diagonal lines in FIG. 10, which include K2 repetitions. FIG. 10 also depicts there are a number of soft type of overlapping resources. FIG. 10 also includes an early termination instance, DCI, and ACK/NACKs.

FIG. 10 shows that overlapping resources allocated for a forwarding entity may start after an early termination instance at a reception entity. As depicted in FIG. 10, the reception entity (e.g., an IAB MT for DL) may stop RX upon successfully decoding at least one packet before the end of the repetitions (i.e., an early termination instance). In this case, though a parent node may not be aware of the early termination at the IAB MT and may continue to transmit, the IAB MT may stop RX and allow a co-located IAB DU to use the remaining resources. As shown in FIG. 10, once the reception entity stops RX upon a successful reception, the co-located forwarding entity (e.g., an IAB DU for DL) may allocate resources with repetitions that overlap with remaining unused resources of the reception entity for TX toward a next hop node. Also, the overlapping resources may be a soft type. According to implicit determination principle for soft resources, the IAB DU may use the remaining soft resources after an IAB MT stops RX upon successful reception.

Figure 11:
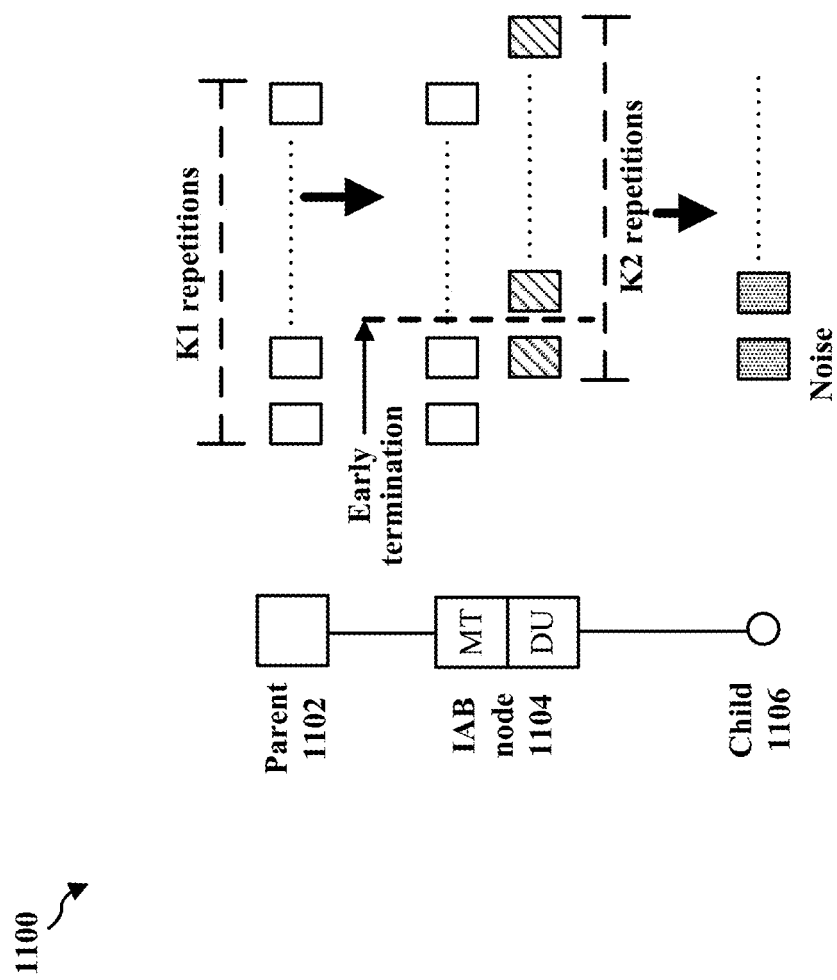
FIG. 11 is a diagram illustrating an example repetition transmission.

FIG. 11 is a diagram 1100 illustrating an example repetition transmission. As shown in FIG. 11, diagram 1100 includes parent node 1102, IAB node 1104, and child node 1106. FIG. 11 depicts repetition with overlapping resources across an IAB MT of IAB node 1104 and an IAB DU of IAB node 1104. FIG. 11 includes a number of repetition resources corresponding to the MT and the DU. For instance, the repetition resources corresponding to the MT of IAB node 1104 are white in FIG. 11, which include K1 repetitions. The repetition resources corresponding to the DU of IAB node 1104 have diagonal lines in FIG. 11, which include K2 repetitions. FIG. 11 also depicts noise among the resources, which includes a dotted pattern, as well as an early termination instance.

FIG. 11 shows that overlapping resources allocated for a forwarding entity may start before an early termination instance at a reception entity. As illustrated in FIG. 11, the overlapping resources allocated for a forwarding entity (e.g., an IAB DU for DL or an IAB MT for UL) may start before the early termination instance at a reception entity (e.g., an IAB MT for DL or an IAB DU for UL). In this case, the forwarding entity may not be able to use the full resource allocation for packet forwarding at all times. The forwarding entity may have to skip some of the beginning repetition units (in slots or mini-slots) until the early termination instance, and start to forward the packet to the next hop node near the middle of the repetition units.

As shown in FIG. 11, there may be impacts to the reception entity at the next hop node. For an unknown starting time for effective reception, the first few allocated resources for reception may contain noise. For an under-optimized redundancy version (RV) pattern, the existing RV pattern defined for repetition may not be optimized for cases with skipped transmissions, e.g., the first received signal after skipping may not have a RV with sufficient systematic bits for decoding. Also, there may be a reduced number of repetitions compared to a target value due to the skipped TX.

As indicated above, in some aspects, overlapping resources may start before an early termination instance. For a resource allocation with repetition that spans over multiple slots or mini-slots, a flag may be associated with this resource allocation to enable or disable operation of a floating starting time. The flag may be indicated to the TX node and/or the RX node of this resource allocation as part of an RRC configuration associated with the resource allocation by an IAB donor CU, or as part of a DCI grant for scheduling the resource allocation by the scheduling node. The DCI grant may be a grant for dynamic scheduling or an activation grant for SPS or an UL configured grant. In some cases, additional information, such as the number of skipped repetition units, may also be indicated by the forwarding entity to the next hop node via a medium access control (MAC) control element (MAC-CE), DCI, or UCI for a more efficient reception at the next hop node.

If an enabling flag is indicated, the RX node may assume that the TX node may start TX near the middle of the repetition units (e.g., in slots or mini-slots) and optimize its reception procedure accordingly. For example, the RX node may perform some hypothesis testing on starting slots or mini-slots within the allocated resources during reception. A separate RV pattern may be indicated for the case with a floating starting time enabled. For example, this may include RV patterns that contain certain RV versions, e.g., RV0 and/or RV3, with sufficient systematic bits. If additional information, such as the number of skipped repetition units, is also indicated to the RX node, the RX node may also skip these repetition units during reception and/or a decoding procedure.

If an enabling flag is indicated for the resource allocation and the forwarding entity starts TX near a middle of the repetition units, one or more of options may be adopted by the forwarding entity. In some aspects, the number of TXs may be equal to the remaining number of repetitions, i.e., the total number of allocated repetitions minus the skipped number of repetitions. In these aspects, the number of TXs may vary depending on the starting time. Also, the forwarding entity may schedule additional TXs via another dynamic DCI to meet a target reliability.

In other instances, a fixed number of TXs may be indicated for the resource allocation regardless of the starting time. In these instances, the total number of allocated repetitions may be equal to the latest starting TX plus the indicated number of TXs. Also, the latest starting TX at the forwarding entity of an IAB node may correspond to the end of the allocation at the co-located reception entity of the IAB node.

Figure 12:
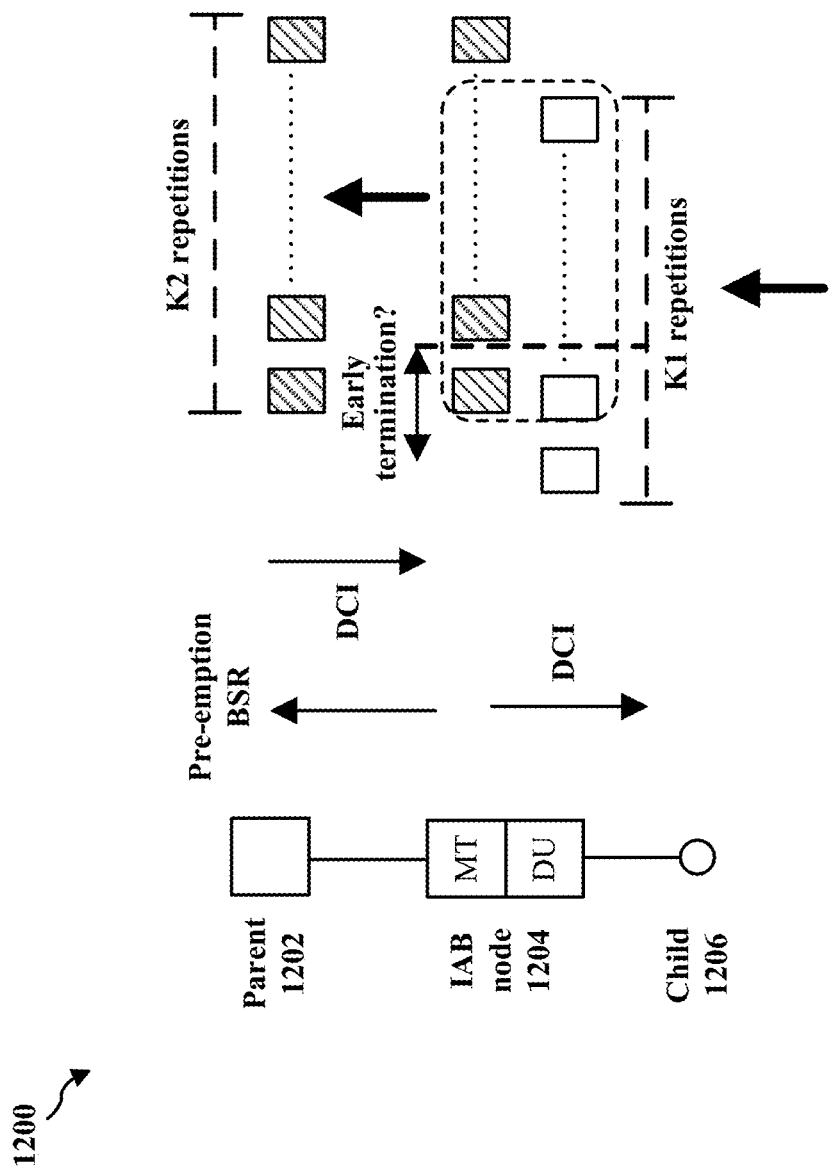
FIG. 12 is a diagram illustrating an example repetition transmission.

FIG. 12 is a diagram 1200 illustrating an example repetition transmission. As shown in FIG. 12, diagram 1200 includes parent node 1202, IAB node 1204, and child node 1206. FIG. 12 depicts repetition with overlapping resources across an IAB MT of IAB node 1204 and an IAB DU of IAB node 1204. FIG. 12 includes a number of repetition resources corresponding to the MT and the DU. For instance, the repetition resources corresponding to the DU of IAB node 1204 are white in FIG. 12, which include K1 repetitions. The repetition resources corresponding to the MT of IAB node 1204 have diagonal lines in FIG. 12, which include K2 repetitions. FIG. 12 also depicts an early termination instance, DCI, and a pre-emption BSR.

As shown in FIG. 12, for UL communication, a parent DU may utilize some information on a child DU's resource allocation, e.g., a starting slot or mini-slot index, in order to determine the overlapping resources for an IAB MT. This information may be utilized by the parent DU in case of dynamic UL scheduling and/or a periodic allocation via a configured grant, e.g., a type-2 configured grant. For both cases, information of the child DU's resource allocation, e.g., a starting slot or mini-slot index, may be indicated to the parent DU by a child IAB MT. Signaling overhead may also be a concern for dynamic UL scheduling. For periodic allocation via a configured grant, e.g., a type-2 configured grant, signaling overhead may not be a concern because information may be indicated for one allocation and be applied periodically. This information may not be utilized for a periodic allocation via a type 1 configured grant, as the full resource allocation may be determined by a donor CU via an RRC configuration, and the donor CU may align the overlapping resources.

In some aspects, for an IAB node, a first set of resources with a repetition spanning multiple slots or mini-slots may be allocated for a reception entity of the IAB node to receive at least one packet. Also, a second set of resources with a repetition spanning multiple slots or mini-slots may be allocated for a forwarding entity of the IAB node to forward the received packet to the next hop node, where there are overlapping resources between the first set of resources and the second set of resources. The number of repetition units in the first set of resources may be different from the second set of resources. For DL, the reception entity may be an MT of the IAB node, the forwarding entity may be a DU of the IAB node, and the next hop node may be a child node of the IAB node. For UL, the reception entity may be a DU of the IAB node, the forwarding entity may be a MT of the IAB node, and the next hop node may be the parent node of the IAB node. In some instances, the overlapping resources at the forwarding entity may start after a successful reception of a packet at the co-located reception node. Also, the overlapping resources at the forwarding entity may start before the successful reception of a packet at the co-located reception node.

In some instances, one or more second repetition units may belong to a second set of UL or DL resources allocated to a forwarding entity of a node for communication with a next hop node. Also, at least one first resource of a first set of UL or DL resources may overlap with at least one second resource of the second set of UL or DL resources. The resources with repetition units may be allocated for communication based on an average or worst channel condition in order to achieve a target reliability. Due to varying channel conditions in a wireless network, in some cases with more favorable channel conditions, a reception entity may be able to decode a data packet near the middle of the allocated repetition units. By allowing overlapping resources between the first set of resources allocated for the reception entity and the second set of resources allocated for the forwarding entity, the packet may be forwarded to the next hop node immediately after the early termination instance at the reception entity. As a result, latency may be improved significantly over a multi-hop network.

In some aspects, the second set of resources may be allocated for the forwarding entity after the early termination instance at the reception entity. For example, in dynamic DL scheduling via DCI, the scheduling node for allocation of the second set of resources may correspond to the forwarding entity. In this case, the forwarding entity may allocate the second set of resources via dynamic DCI to the next hop node after the early termination instance at the co-located reception entity. In this case, the starting location of the second set of resources may be dynamically determined, which may be located after the early termination instance at the reception entity. Also, in this case, both the forwarding entity and the next hop node may perform normal communication based on the allocation.

In other aspects, the second set of resources may be allocated for the forwarding entity before the early termination instance at the reception entity. For example, the second set of resources may be semi-persistently allocated via DL SPS or an UL configured grant. In another example, in dynamic UL scheduling, the scheduling node for allocation of the second set of resources may be another node, which may not know the early termination instance of this node. In this case, the second set of resources may start before the early termination instance at the reception entity, and the forwarding entity may skip some of the beginning repetition units of the second set of resources and transmit the data packet to the next hop node via the second resources after the early termination instance at the reception entity.

Additionally, as indicated above, nodes may receive, from a last hop node, a notification flag indicating one or more potentially skipped resources, the one or more potentially skipped resources being skipped by the last hop node at a beginning of a first set of UL or DL resources, where a received UL or DL communication is based on the notification flag. In some examples, the notification flag may be initiated or generated by a last hop node. In some examples, the notification flag may be initiated by a CU of the network and be delivered via a last hop node. Nodes herein may also transmit, to the next hop node, a notification flag indicating one or more potentially skipped resources, the one or more potentially skipped resources being skipped by the forwarding entity at a beginning of the second set of UL or DL resources.

Figure 13:
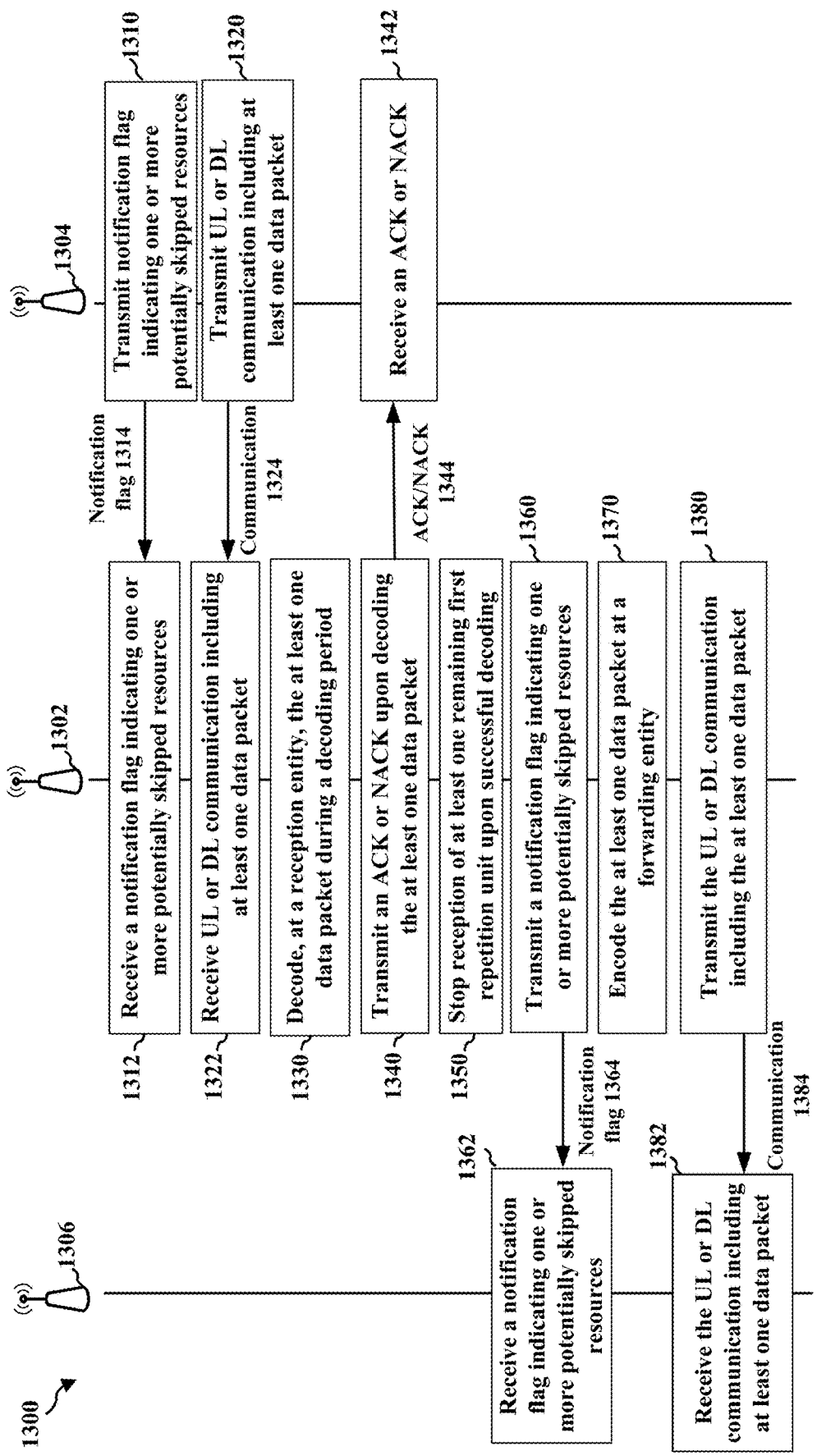
FIG. 13 is a diagram illustrating example communication between nodes.

FIG. 13 is a diagram 1300 illustrating example communication between a first node 1302, e.g., an IAB node, at least one second node 1304, e.g., a last hop node, and at least one third node 1306, e.g., a next hop node.

At 1310, second node 1304 may transmit a notification flag, e.g., notification flag 1314, indicating one or more potentially skipped resources. At 1312, first node 1302 may receive, from a last hop node, a notification flag, e.g., notification flag 1314, indicating one or more potentially skipped resources, the one or more potentially skipped resources being skipped by the last hop node at a beginning of a first set of uplink (UL) or downlink (DL) resources, where a received UL or DL communication is based on the notification flag.

In some aspects, the node may be an integrated access and backhaul (IAB) node associated with an IAB network, the reception entity corresponding to a mobile termination (MT) of the node or a distributed unit (DU) of the node, and the forwarding entity corresponding to the DU of the node or the MT of the node. When the UL or DL communication is UL communication, the reception entity may correspond to the DU of the node and the forwarding entity may correspond to the MT of the node, the next hop node corresponding to a parent IAB node or an IAB donor. When the UL or DL communication is DL communication, the reception entity may correspond to the MT of the node and the forwarding entity may correspond to the DU of the node, the next hop node corresponding to a child IAB node or a child user equipment (UE).

In some instances, upon receiving the notification flag, the reception entity may apply hypothesis testing on a starting location of a first resource of the first set of UL or DL resources, the first resource transmitted by the last hop node, the hypothesis testing being applied while receiving the UL or DL communication from the last hop node. Also, upon receiving the notification flag, the reception entity may apply a pattern of redundancy version (RV) over one or more repetition resource units, the one or more repetition resource units being different when the notification flag is not received. The notification flag may be received via a radio resource control (RRC) message or an F1 application protocol (F1-AP) message from an integrated access and backhaul (IAB) donor central unit (CU), or the notification flag is received via a medium access control (MAC) control element (MAC-CE) or downlink control information (DCI) from the last hop node. The last hop node may be a parent node of the node for DL communication or a child node of the node for UL communication.

At 1320, second node 1304 may transmit UL or DL communication, e.g., communication 1324, including at least one data packet. At 1322, first node 1302 may receive, via a first set of UL or DL resources, UL or DL communication, e.g., communication 1324, including at least one data packet, the first set of UL or DL resources allocated for a reception entity of the node.

At 1330, first node 1302 may decode, at the reception entity, the at least one data packet during a decoding period, the decoding period including a decoding start time and a decoding completion time.

At 1340, first node 1302 may transmit an acknowledgement (ACK) or negative ACK (NACK), e.g., ACK/NACK 1344, upon decoding the at least one data packet at the reception entity of the node. At 1342, second node 1304 may receive an ACK/NACK, e.g., ACK/NACK 1344.

At 1350, first node 1302 may stop reception of at least one remaining first repetition unit of the one or more first repetition units upon successfully decoding the at least one data packet, where the reception of the at least one remaining first repetition unit is stopped at an early termination instance. In some aspects, the reception entity may attempt to decode the at least one data packet upon reception of each of the one or more first repetition units.

At 1360, first node 1302 may transmit, to the next hop node, a notification flag, e.g., notification flag 1364, indicating one or more potentially skipped resources, the one or more potentially skipped resources being skipped by the forwarding entity at a beginning of the second set of UL or DL resources. At 1362, third node 1306 may receive a notification flag, e.g., notification flag 1364, indicating one or more potentially skipped resources.

At 1370, first node 1302 may encode the at least one data packet at the forwarding entity of the node, the at least one data packet being transmitted to the next hop node via the one or more second repetition units after the at least one data packet is encoded, where the one or more second repetition units overlap with the at least one remaining first repetition unit.

At 1380, first node 1302 may transmit, via a second set of UL or DL resources, the UL or DL communication, e.g., communication 1384, including the at least one data packet to a next hop node, the second set of UL or DL resources allocated for a forwarding entity of the node, at least one first resource of the first set of UL or DL resources overlapping with at least one second resource of the second set of UL or DL resources. At 1382, third node 1306 may receive UL or DL communication, e.g., communication 1384, including at least one data packet. The first set of UL or DL resources may include one or more first repetition units and the second set of UL or DL resources include one or more second repetition units. Also, an amount of the one or more first repetition units may be different from an amount of the one or more second repetition units.

In some aspects, the second set of UL or DL resources may be allocated after the decoding completion time. The allocated second set of UL or DL resources may overlap with one or more remaining first resources of the first set of UL or DL resources, the one or more remaining first resources not being used by the reception entity. Also, the second set of UL or DL resources may be allocated before the decoding completion time. The second set of UL or DL resources may be allocated based on an assumption of an earliest possible decoding completion time. Further, at least one second resource of the second set of UL or DL resources may begin prior to the decoding completion time, where the forwarding entity may skip the at least one second resource, where the forwarding entity may transmit the at least one data packet to the next hop node via a portion of the second set of UL or DL resources that begins after the decoding completion time.

In some instances, a number of repetition transmissions performed by the forwarding entity may be equal to a difference between a total number of allocated repetition units of the second set of UL or DL resources and a number of skipped repetition units before the decoding completion time. A number of repetition transmissions performed by the forwarding entity may also be equal to a fixed number. The fixed number may be equal to a difference between a total number of allocated repetition units and a maximum number of skipped repetition units.

Additionally, the first set of UL or DL resources may include one or more first slots or mini-slots and the second set of UL or DL resources may include one or more second slots or mini-slots. The at least one data packet may be associated with one or more data packet repetitions or one or more data packet retransmissions. Further, at least one of the first set of UL or DL resources or the second set of UL or DL resources may be configured via DL semi-persistent scheduling (SPS), configured via an UL configured grant, or scheduled via dynamic downlink control information (DCI).

Figure 14:
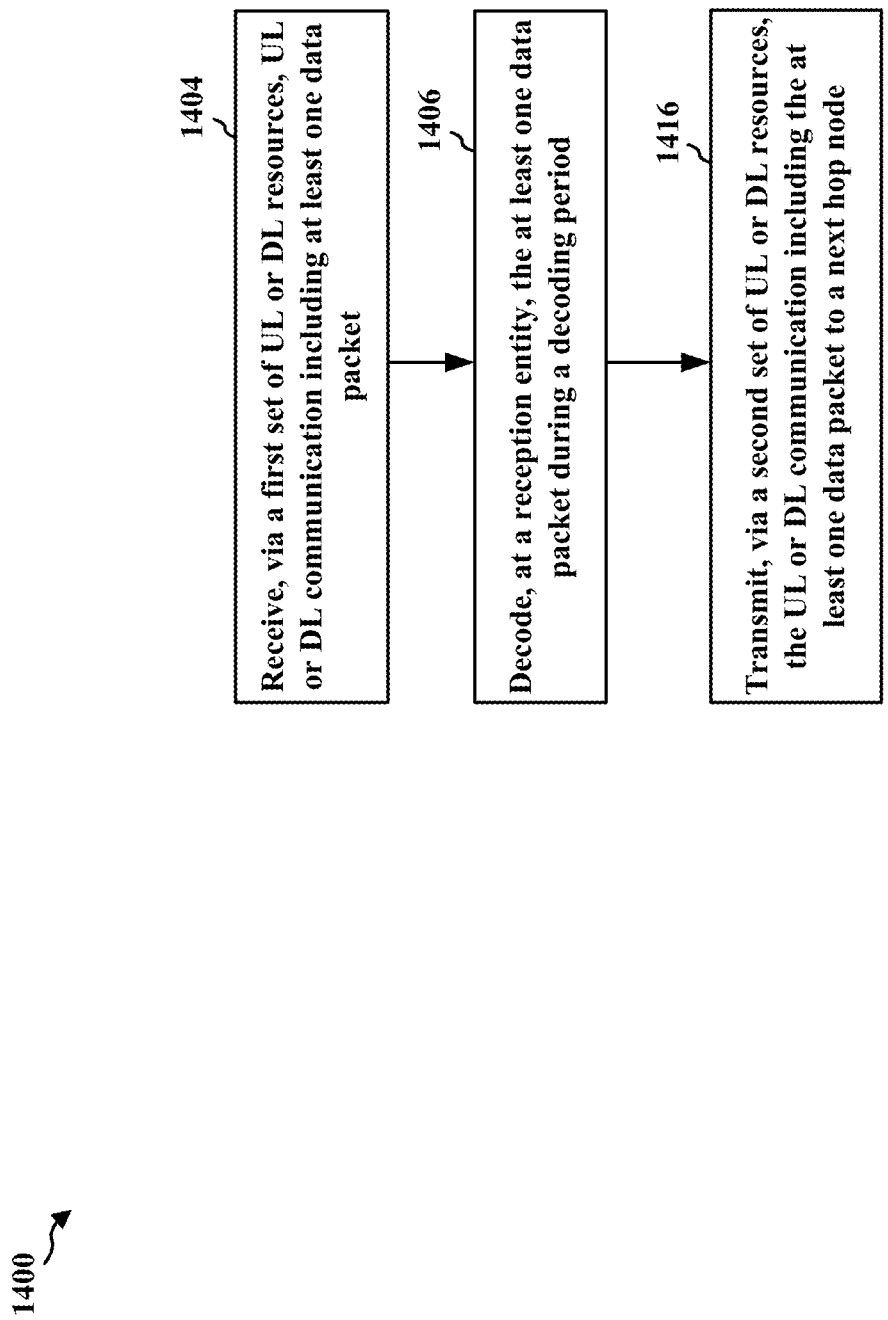
FIG. 14 is a flowchart of a method of wireless communication.

FIG. 14 is a flowchart 1400 of a method of wireless communication. The method may be performed by a node or base station or a component of a node or base station (e.g., the base station 102, 180, 310, node 604, 654, 704, 804, 904, 954, 1004, 1104, 1204, 1302; the apparatus 1802; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 1404, the apparatus may receive, via a first set of uplink (UL) or downlink (DL) resources, UL or DL communication including at least one data packet, the first set of UL or DL resources allocated for a reception entity of the node, as described in connection with the examples in FIGS. 4, 5A, 5B, 6A, 6B, 7, 8, 9A, 9B, 10, 11, 12, and 13. For example, node 1302 may receive, via a first set of UL or DL resources, UL or DL communication including at least one data packet, the first set of UL or DL resources allocated for a reception entity of the node, as described in connection with 1322 in FIG. 13. Further, 1404 may be performed by determination component 1840.

At 1406, the apparatus may decode, at the reception entity, the at least one data packet during a decoding period, the decoding period including a decoding start time and a decoding completion time, as described in connection with the examples in FIGS. 4, 5A, 5B, 6A, 6B, 7, 8, 9A, 9B, 10, 11, 12, and 13. For example, node 1302 may decode, at the reception entity, the at least one data packet during a decoding period, the decoding period including a decoding start time and a decoding completion time, as described in connection with 1330 in FIG. 13. Further, 1406 may be performed by determination component 1840.

At 1416, the apparatus may transmit, via a second set of UL or DL resources, the UL or DL communication including the at least one data packet to a next hop node, the second set of UL or DL resources allocated for a forwarding entity of the node, at least one first resource of the first set of UL or DL resources overlapping with at least one second resource of the second set of UL or DL resources, as described in connection with the examples in FIGS. 4, 5A, 5B, 6A, 6B, 7, 8, 9A, 9B, 10, 11, 12, and 13. For example, node 1302 may transmit, via a second set of UL or DL resources, the UL or DL communication including the at least one data packet to a next hop node, the second set of UL or DL resources allocated for a forwarding entity of the node, at least one first resource of the first set of UL or DL resources overlapping with at least one second resource of the second set of UL or DL resources, as described in connection with 1380 in FIG. 13. Further, 1416 may be performed by determination component 1840. The first set of UL or DL resources may include one or more first repetition units and the second set of UL or DL resources include one or more second repetition units, as described in connection with the examples in FIGS. 4, 5A, 5B, 6A, 6B, 7, 8, 9A, 9B, 10, 11, 12, and 13. Also, an amount of the one or more first repetition units may be different from an amount of the one or more second repetition units, as described in connection with the examples in FIGS. 4, 5A, 5B, 6A, 6B, 7, 8, 9A, 9B, 10, 11, 12, and 13.

Figure 15:
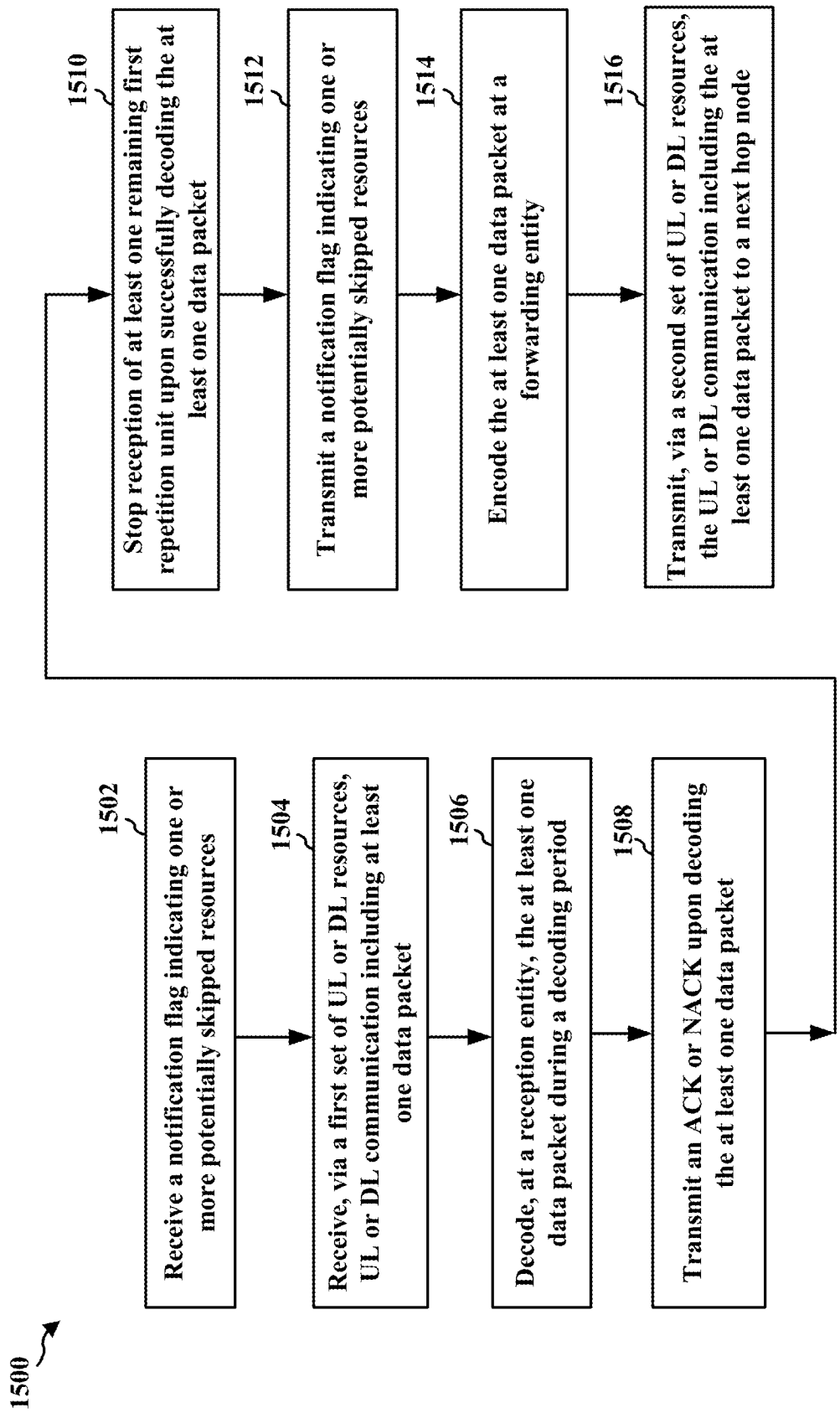
FIG. 15 is a flowchart of a method of wireless communication.

FIG. 15 is a flowchart 1500 of a method of wireless communication. The method may be performed by a node or base station or a component of a node or base station (e.g., the base station 102, 180, 310, node 604, 654, 704, 804, 904, 954, 1004, 1104, 1204, 1302; the apparatus 1802; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 1502, the apparatus may receive, from a last hop node, a notification flag indicating one or more potentially skipped resources, the one or more potentially skipped resources being skipped by the last hop node at a beginning of a first set of uplink (UL) or downlink (DL) resources, where a received UL or DL communication is based on the notification flag, as described in connection with the examples in FIGS. 4, 5A, 5B, 6A, 6B, 7, 8, 9A, 9B, 10, 11, 12, and 13. For example, node 1302 may receive, from a last hop node, a notification flag indicating one or more potentially skipped resources, the one or more potentially skipped resources being skipped by the last hop node at a beginning of a first set of uplink (UL) or downlink (DL) resources, where a received UL or DL communication is based on the notification flag, as described in connection with 1312 in FIG. 13. Further, 1502 may be performed by determination component 1840.

In some aspects, the node may be an integrated access and backhaul (IAB) node associated with an IAB network, the reception entity corresponding to a mobile termination (MT) of the node or a distributed unit (DU) of the node, and the forwarding entity corresponding to the DU of the node or the MT of the node, as described in connection with the examples in FIGS. 4, 5A, 5B, 6A, 6B, 7, 8, 9A, 9B, 10, 11, 12, and 13. When the UL or DL communication is UL communication, the reception entity may correspond to the DU of the node and the forwarding entity may correspond to the MT of the node, the next hop node corresponding to a parent IAB node or an IAB donor, as described in connection with the examples in FIGS. 4, 5A, 5B, 6A, 6B, 7, 8, 9A, 9B, 10, 11, 12, and 13. When the UL or DL communication is DL communication, the reception entity may correspond to the MT of the node and the forwarding entity may correspond to the DU of the node, the next hop node corresponding to a child IAB node or a child user equipment (UE), as described in connection with the examples in FIGS. 4, 5A, 5B, 6A, 6B, 7, 8, 9A, 9B, 10, 11, 12, and 13.

In some instances, upon receiving the notification flag, the reception entity may apply hypothesis testing on a starting location of a first resource of the first set of UL or DL resources, the first resource transmitted by the last hop node, the hypothesis testing being applied while receiving the UL or DL communication from the last hop node, as described in connection with the examples in FIGS. 4, 5A, 5B, 6A, 6B, 7, 8, 9A, 9B, 10, 11, 12, and 13. Also, upon receiving the notification flag, the reception entity may apply a pattern of redundancy version (RV) over one or more repetition resource units, the one or more repetition resource units being different when the notification flag is not received, as described in connection with the examples in FIGS. 4, 5A, 5B, 6A, 6B, 7, 8, 9A, 9B, 10, 11, 12, and 13. The notification flag may be received via a radio resource control (RRC) message or an F1 application protocol (F1-AP) message from an integrated access and backhaul (IAB) donor central unit (CU), or the notification flag is received via a medium access control (MAC) control element (MAC-CE) or downlink control information (DCI) from the last hop node, as described in connection with the examples in FIGS. 4, 5A, 5B, 6A, 6B, 7, 8, 9A, 9B, 10, 11, 12, and 13. The last hop node may be a parent node of the node for DL communication or a child node of the node for UL communication, as described in connection with the examples in FIGS. 4, 5A, 5B, 6A, 6B, 7, 8, 9A, 9B, 10, 11, 12, and 13.

At 1504, the apparatus may receive, via a first set of UL or DL resources, UL or DL communication including at least one data packet, the first set of UL or DL resources allocated for a reception entity of the node, as described in connection with the examples in FIGS. 4, 5A, 5B, 6A, 6B, 7, 8, 9A, 9B, 10, 11, 12, and 13. For example, node 1302 may receive, via a first set of UL or DL resources, UL or DL communication including at least one data packet, the first set of UL or DL resources allocated for a reception entity of the node, as described in connection with 1322 in FIG. 13. Further, 1504 may be performed by determination component 1840.

At 1506, the apparatus may decode, at the reception entity, the at least one data packet during a decoding period, the decoding period including a decoding start time and a decoding completion time, as described in connection with the examples in FIGS. 4, 5A, 5B, 6A, 6B, 7, 8, 9A, 9B, 10, 11, 12, and 13. For example, node 1302 may decode, at the reception entity, the at least one data packet during a decoding period, the decoding period including a decoding start time and a decoding completion time, as described in connection with 1330 in FIG. 13. Further, 1506 may be performed by determination component 1840.

At 1508, the apparatus may transmit an acknowledgement (ACK) or negative ACK (NACK) upon decoding the at least one data packet at the reception entity of the node, as described in connection with the examples in FIGS. 4, 5A, 5B, 6A, 6B, 7, 8, 9A, 9B, 10, 11, 12, and 13. For example, node 1302 may transmit an acknowledgement (ACK) or negative ACK (NACK) upon decoding the at least one data packet at the reception entity of the node, as described in connection with 1340 in FIG. 13. Further, 1508 may be performed by determination component 1840.

At 1510, the apparatus may stop reception of at least one remaining first repetition unit of the one or more first repetition units upon successfully decoding the at least one data packet, where the reception of the at least one remaining first repetition unit is stopped at an early termination instance, as described in connection with the examples in FIGS. 4, 5A, 5B, 6A, 6B, 7, 8, 9A, 9B, 10, 11, 12, and 13. For example, node 1302 may stop reception of at least one remaining first repetition unit of the one or more first repetition units upon successfully decoding the at least one data packet, where the reception of the at least one remaining first repetition unit is stopped at an early termination instance, as described in connection with 1350 in FIG. 13. Further, 1510 may be performed by determination component 1840. In some aspects, the reception entity may attempt to decode the at least one data packet upon reception of each of the one or more first repetition units, as described in connection with the examples in FIGS. 4, 5A, 5B, 6A, 6B, 7, 8, 9A, 9B, 10, 11, 12, and 13.

At 1512, the apparatus may transmit, to the next hop node, a notification flag indicating one or more potentially skipped resources, the one or more potentially skipped resources being skipped by the forwarding entity at a beginning of the second set of UL or DL resources, as described in connection with the examples in FIGS. 4, 5A, 5B, 6A, 6B, 7, 8, 9A, 9B, 10, 11, 12, and 13. For example, node 1302 may transmit, to the next hop node, a notification flag indicating one or more potentially skipped resources, the one or more potentially skipped resources being skipped by the forwarding entity at a beginning of the second set of UL or DL resources, as described in connection with 1360 in FIG. 13. Further, 1512 may be performed by determination component 1840.

At 1514, the apparatus may encode the at least one data packet at the forwarding entity of the node, the at least one data packet being transmitted to the next hop node via the one or more second repetition units after the at least one data packet is encoded, where the one or more second repetition units overlap with the at least one remaining first repetition unit, as described in connection with the examples in FIGS. 4, 5A, 5B, 6A, 6B, 7, 8, 9A, 9B, 10, 11, 12, and 13. For example, node 1302 may encode the at least one data packet at the forwarding entity of the node, the at least one data packet being transmitted to the next hop node via the one or more second repetition units after the at least one data packet is encoded, where the one or more second repetition units overlap with the at least one remaining first repetition unit, as described in connection with 1370 in FIG. 13. Further, 1514 may be performed by determination component 1840.

At 1516, the apparatus may transmit, via a second set of UL or DL resources, the UL or DL communication including the at least one data packet to a next hop node, the second set of UL or DL resources allocated for a forwarding entity of the node, at least one first resource of the first set of UL or DL resources overlapping with at least one second resource of the second set of UL or DL resources, as described in connection with the examples in FIGS. 4, 5A, 5B, 6A, 6B, 7, 8, 9A, 9B, 10, 11, 12, and 13. For example, node 1302 may transmit, via a second set of UL or DL resources, the UL or DL communication including the at least one data packet to a next hop node, the second set of UL or DL resources allocated for a forwarding entity of the node, at least one first resource of the first set of UL or DL resources overlapping with at least one second resource of the second set of UL or DL resources, as described in connection with 1380 in FIG. 13. Further, 1516 may be performed by determination component 1840. The first set of UL or DL resources may include one or more first repetition units and the second set of UL or DL resources include one or more second repetition units, as described in connection with the examples in FIGS. 4, 5A, 5B, 6A, 6B, 7, 8, 9A, 9B, 10, 11, 12, and 13. Also, an amount of the one or more first repetition units may be different from an amount of the one or more second repetition units, as described in connection with the examples in FIGS. 4, 5A, 5B, 6A, 6B, 7, 8, 9A, 9B, 10, 11, 12, and 13.

In some aspects, the second set of UL or DL resources may be allocated after the decoding completion time, as described in connection with the examples in FIGS. 4, 5A, 5B, 6A, 6B, 7, 8, 9A, 9B, 10, 11, 12, and 13. The allocated second set of UL or DL resources may overlap with one or more remaining first resources of the first set of UL or DL resources, the one or more remaining first resources not being used by the reception entity, as described in connection with the examples in FIGS. 4, 5A, 5B, 6A, 6B, 7, 8, 9A, 9B, 10, 11, 12, and 13. Also, the second set of UL or DL resources may be allocated before the decoding completion time, as described in connection with the examples in FIGS. 4, 5A, 5B, 6A, 6B, 7, 8, 9A, 9B, 10, 11, 12, and 13. The second set of UL or DL resources may be allocated based on an assumption of an earliest possible decoding completion time, as described in connection with the examples in FIGS. 4, 5A, 5B, 6A, 6B, 7, 8, 9A, 9B, 10, 11, 12, and 13. Further, at least one second resource of the second set of UL or DL resources may begin prior to the decoding completion time, where the forwarding entity may skip the at least one second resource, where the forwarding entity may transmit the at least one data packet to the next hop node via a portion of the second set of UL or DL resources that begins after the decoding completion time, as described in connection with the examples in FIGS. 4, 5A, 5B, 6A, 6B, 7, 8, 9A, 9B, 10, 11, 12, and 13.

In some instances, a number of repetition transmissions performed by the forwarding entity may be equal to a difference between a total number of allocated repetition units of the second set of UL or DL resources and a number of skipped repetition units before the decoding completion time, as described in connection with the examples in FIGS. 4, 5A, 5B, 6A, 6B, 7, 8, 9A, 9B, 10, 11, 12, and 13. A number of repetition transmissions performed by the forwarding entity may also be equal to a fixed number, as described in connection with the examples in FIGS. 4, 5A, 5B, 6A, 6B, 7, 8, 9A, 9B, 10, 11, 12, and 13. The fixed number may be equal to a difference between a total number of allocated repetition units and a maximum number of skipped repetition units, as described in connection with the examples in FIGS. 4, 5A, 5B, 6A, 6B, 7, 8, 9A, 9B, 10, 11, 12, and 13.

Additionally, the first set of UL or DL resources may include one or more first slots or mini-slots and the second set of UL or DL resources may include one or more second slots or mini-slots, as described in connection with the examples in FIGS. 4, 5A, 5B, 6A, 6B, 7, 8, 9A, 9B, 10, 11, 12, and 13. The at least one data packet may be associated with one or more data packet repetitions or one or more data packet retransmissions, as described in connection with the examples in FIGS. 4, 5A, 5B, 6A, 6B, 7, 8, 9A, 9B, 10, 11, 12, and 13. Further, at least one of the first set of UL or DL resources or the second set of UL or DL resources may be configured via DL semi-persistent scheduling (SPS), configured via an UL configured grant, or scheduled via dynamic downlink control information (DCI), as described in connection with the examples in FIGS. 4, 5A, 5B, 6A, 6B, 7, 8, 9A, 9B, 10, 11, 12, and 13.

Figure 16:
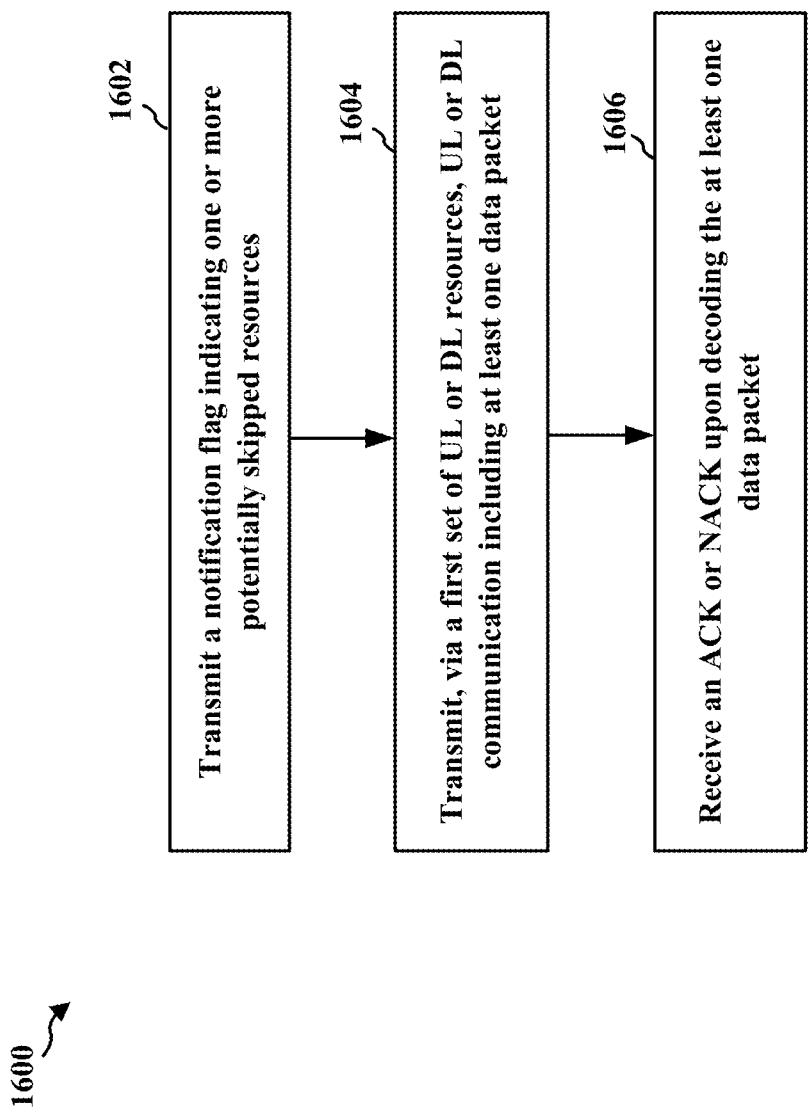
FIG. 16 is a flowchart of a method of wireless communication.

FIG. 16 is a flowchart 1600 of a method of wireless communication. The method may be performed by a node or base station or a component of a node or base station (e.g., the base station 102, 180, 310, node 604, 654, 704, 804, 904, 954, 1004, 1104, 1204, 1304; the apparatus 1902; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 1602, the apparatus may transmit, to the second node, a notification flag indicating one or more potentially skipped resources, the one or more potentially skipped resources being skipped by the first node at a beginning of the first set of UL or DL resources, where the transmitted UL or DL communication is based on the notification flag, as described in connection with the examples in FIGS. 4, 5A, 5B, 6A, 6B, 7, 8, 9A, 9B, 10, 11, 12, and 13. For example, node 1304 may transmit, to the second node, a notification flag indicating one or more potentially skipped resources, the one or more potentially skipped resources being skipped by the first node at a beginning of the first set of UL or DL resources, where the transmitted UL or DL communication is based on the notification flag, as described in connection with 1310 in FIG. 13. Further, 1602 may be performed by determination component 1940.

At 1604, the apparatus may transmit, to a second node via a first set of uplink (UL) or downlink (DL) resources, UL or DL communication including at least one data packet, the first set of UL or DL resources allocated for a reception entity of the second node, as described in connection with the examples in FIGS. 4, 5A, 5B, 6A, 6B, 7, 8, 9A, 9B, 10, 11, 12, and 13. For example, node 1304 may transmit, to a second node via a first set of uplink (UL) or downlink (DL) resources, UL or DL communication including at least one data packet, the first set of UL or DL resources allocated for a reception entity of the second node, as described in connection with 1320 in FIG. 13. Further, 1604 may be performed by determination component 1940.

At 1606, the apparatus may receive, from the second node, an acknowledgement (ACK) or negative ACK (NACK) based on the at least one data packet being decoded at the reception entity of the second node, as described in connection with the examples in FIGS. 4, 5A, 5B, 6A, 6B, 7, 8, 9A, 9B, 10, 11, 12, and 13. For example, node 1304 may receive, from the second node, an acknowledgement (ACK) or negative ACK (NACK) based on the at least one data packet being decoded at the reception entity of the second node, as described in connection with 1342 in FIG. 13. Further, 1606 may be performed by determination component 1940.

Figure 17:
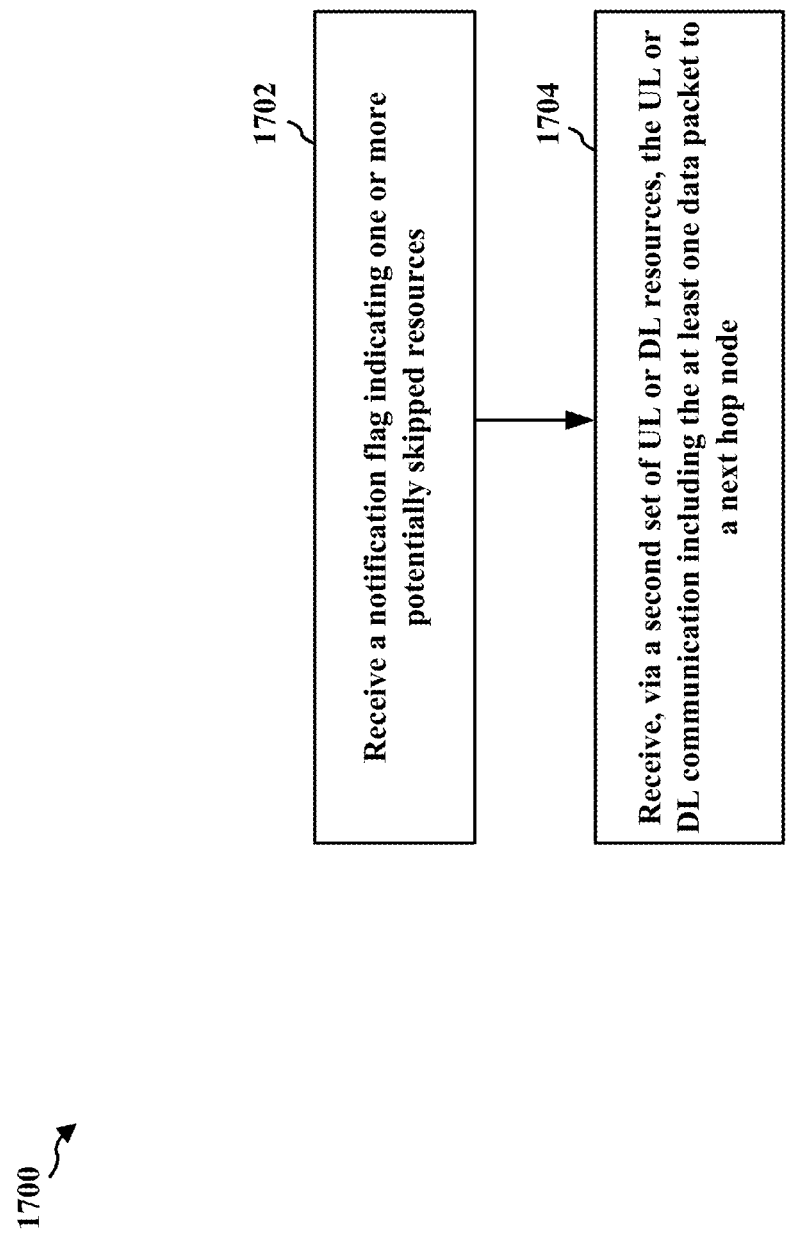
FIG. 17 is a flowchart of a method of wireless communication.

FIG. 17 is a flowchart 1700 of a method of wireless communication. The method may be performed by a node or base station or a component of a node or base station (e.g., the base station 102, 180, 310, node 604, 654, 704, 804, 904, 954, 1004, 1104, 1204, 1306; the apparatus 2002; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 1702, the apparatus may receive, from a second node, a notification flag indicating one or more potentially skipped resources, the one or more potentially skipped resources being skipped by a forwarding entity of the second node at a beginning of a first set of uplink (UL) or downlink (DL) resources, as described in connection with the examples in FIGS. 4, 5A, 5B, 6A, 6B, 7, 8, 9A, 9B, 10, 11, 12, and 13. For example, node 1306 may receive, from a second node, a notification flag indicating one or more potentially skipped resources, the one or more potentially skipped resources being skipped by a forwarding entity of the second node at a beginning of a first set of uplink (UL) or downlink (DL) resources, as described in connection with 1362 in FIG. 13. Further, 1702 may be performed by determination component 2040.

At 1704, the apparatus may receive, from the second node via the first set of UL or DL resources, the UL or DL communication including at least one data packet, the first set of UL or DL resources allocated for the forwarding entity of the second node, where at least one second resource of a second set of UL or DL resources overlaps with at least one first resource of the first set of UL or DL resources, as described in connection with the examples in FIGS. 4, 5A, 5B, 6A, 6B, 7, 8, 9A, 9B, 10, 11, 12, and 13. For example, node 1306 may receive, from the second node via the first set of UL or DL resources, the UL or DL communication including at least one data packet, the first set of UL or DL resources allocated for the forwarding entity of the second node, where at least one second resource of a second set of UL or DL resources overlaps with at least one first resource of the first set of UL or DL resources, as described in connection with 1382 in FIG. 13. Further, 1704 may be performed by determination component 2040.

Figure 18:
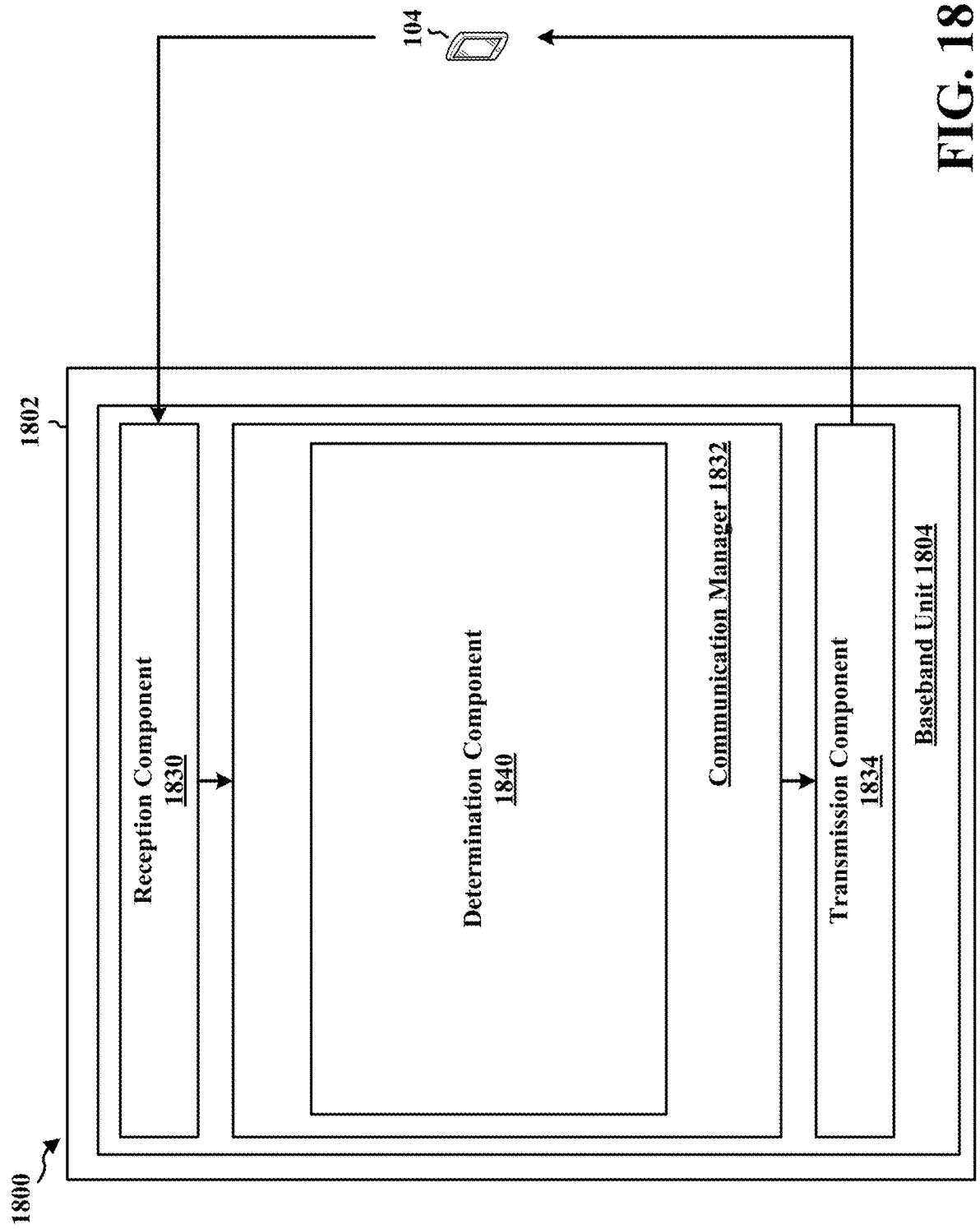
FIG. 18 is a diagram illustrating an example of a hardware implementation for an example apparatus.

FIG. 18 is a diagram 1800 illustrating an example of a hardware implementation for an apparatus 1802. The apparatus 1802 is a base station and includes a baseband unit 1804. The baseband unit 1804 may communicate through a cellular RF transceiver with the UE 104. The baseband unit 1804 may include a computer-readable medium/memory. The baseband unit 1804 is responsible for general processing, including the execution of software stored on the computer-readable medium/memory. The software, when executed by the baseband unit 1804, causes the baseband unit 1804 to perform the various functions described supra. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband unit 1804. The baseband unit 1804 may be a component of the BS 310 and may include the memory 376 and/or at least one of the TX processor 316, the RX processor 370, and the controller/processor 375.

The communication manager 1832 includes a determination component 1840 that is configured to receive, from a last hop node, a notification flag indicating one or more potentially skipped resources, the one or more potentially skipped resources being skipped by the last hop node at a beginning of the first set of UL or DL resources, where the received UL or DL communication is based on the notification flag, e.g., as described in connection with step 1502 above. Determination component 1840 may also be configured to receive, via a first set of uplink (UL) or downlink (DL) resources, UL or DL communication including at least one data packet, the first set of UL or DL resources allocated for a reception entity of the node, e.g., as described in connection with step 1504 above. Determination component 1840 may also be configured to decode, at the reception entity, the at least one data packet during a decoding period, the decoding period including a decoding start time and a decoding completion time, e.g., as described in connection with step 1506 above. Determination component 1840 may also be configured to transmit an acknowledgement (ACK) or negative ACK (NACK) upon decoding the at least one data packet at the reception entity of the node, e.g., as described in connection with step 1508 above. Determination component 1840 may also be configured to stop reception of at least one remaining first repetition unit of the one or more first repetition units upon successfully decoding the at least one data packet, where the reception of the at least one remaining first repetition unit is stopped at an early termination instance, e.g., as described in connection with step 1510 above. Determination component 1840 may also be configured to transmit, to the next hop node, a notification flag indicating one or more potentially skipped resources, the one or more potentially skipped resources being skipped by the forwarding entity at a beginning of the second set of UL or DL resources, e.g., as described in connection with step 1512 above. Determination component 1840 may also be configured to encode the at least one data packet at the forwarding entity of the node, the at least one data packet being transmitted to the next hop node via the one or more second repetition units after the at least one data packet is encoded, where the one or more second repetition units overlap with the at least one remaining first repetition unit, e.g., as described in connection with step 1514 above. Determination component 1840 may also be configured to transmit, via a second set of UL or DL resources, the UL or DL communication including the at least one data packet to a next hop node, the second set of UL or DL resources allocated for a forwarding entity of the node, at least one first resource of the first set of UL or DL resources overlapping with at least one second resource of the second set of UL or DL resources, e.g., as described in connection with step 1516 above.

The apparatus may include additional components that perform each of the blocks of the algorithm in the aforementioned flowcharts of FIGS. 13-15. As such, each block in the aforementioned flowcharts of FIGS. 13-15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the baseband unit 1804, includes means for receiving, via a first set of uplink (UL) or downlink (DL) resources, UL or DL communication including at least one data packet, the first set of UL or DL resources allocated for a reception entity of the node. The apparatus 1802 may also include means for decoding, at the reception entity, the at least one data packet during a decoding period, the decoding period including a decoding start time and a decoding completion time. The apparatus 1802 may also include means for transmitting, via a second set of UL or DL resources, the UL or DL communication including the at least one data packet to a next hop node, the second set of UL or DL resources allocated for a forwarding entity of the node, at least one first resource of the first set of UL or DL resources overlapping with at least one second resource of the second set of UL or DL resources. The apparatus 1802 may also include means for receiving, from a last hop node, a notification flag indicating one or more potentially skipped resources, the one or more potentially skipped resources being skipped by the last hop node at a beginning of the first set of UL or DL resources, where the received UL or DL communication is based on the notification flag. The apparatus 1802 may also include means for transmitting an acknowledgement (ACK) or negative ACK (NACK) upon decoding the at least one data packet at the reception entity of the node. The apparatus 1802 may also include means for stopping reception of at least one remaining first repetition unit of the one or more first repetition units upon successfully decoding the at least one data packet, where the reception of the at least one remaining first repetition unit is stopped at an early termination instance. The apparatus 1802 may also include means for transmitting, to the next hop node, a notification flag indicating one or more potentially skipped resources, the one or more potentially skipped resources being skipped by the forwarding entity at a beginning of the second set of UL or DL resources. The apparatus 1802 may also include means for encoding the at least one data packet at the forwarding entity of the node, the at least one data packet being transmitted to the next hop node via the one or more second repetition units after the at least one data packet is encoded, where the one or more second repetition units overlap with the at least one remaining first repetition unit. The aforementioned means may be one or more of the aforementioned components of the apparatus 1802 configured to perform the functions recited by the aforementioned means. As described supra, the apparatus 1802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 19:
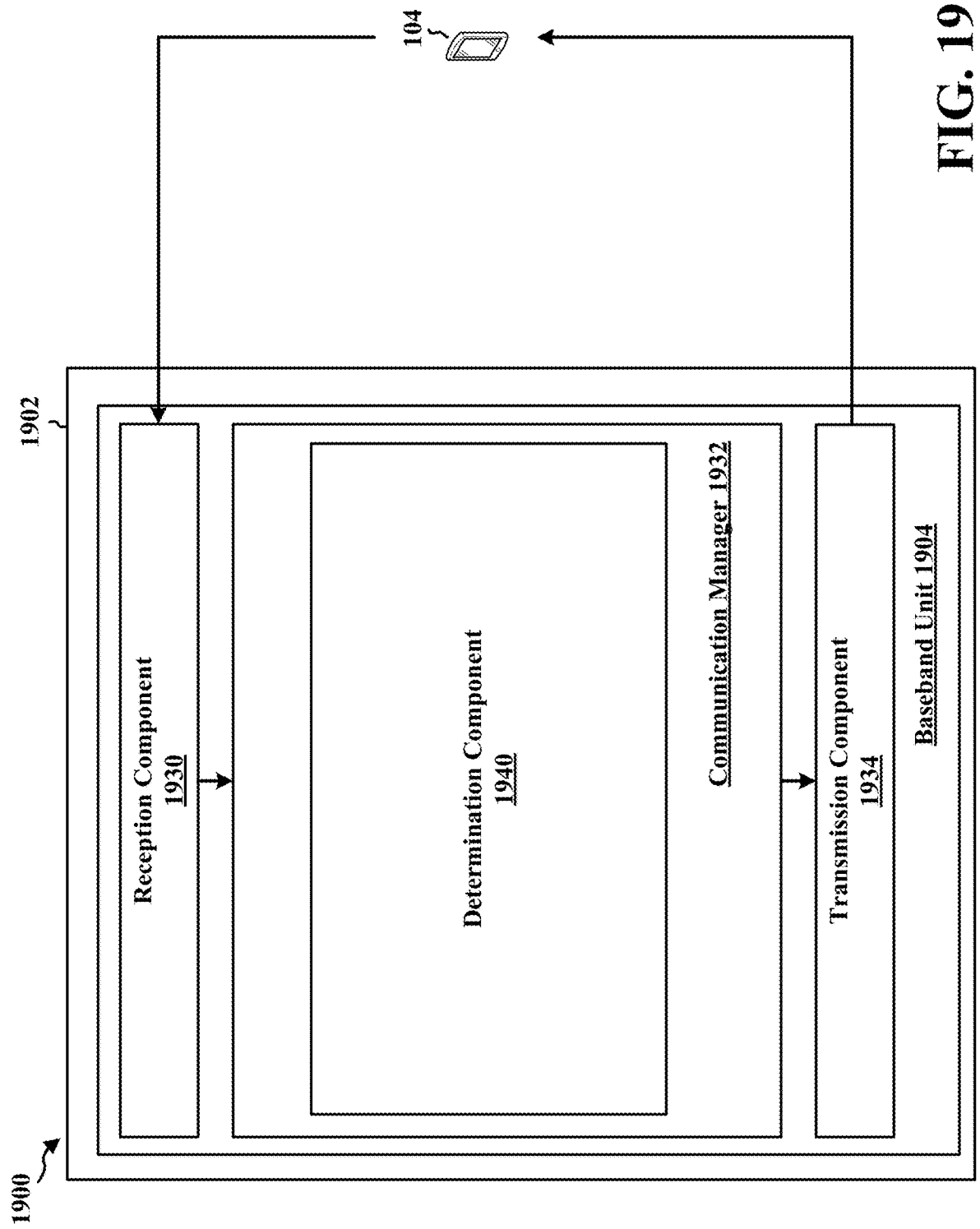
FIG. 19 is a diagram illustrating an example of a hardware implementation for an example apparatus.

FIG. 19 is a diagram 1900 illustrating an example of a hardware implementation for an apparatus 1902. The apparatus 1902 is a base station and includes a baseband unit 1904. The baseband unit 1904 may communicate through a cellular RF transceiver with the UE 104. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the BS 310 and may include the memory 376 and/or at least one of the TX processor 316, the RX processor 370, and the controller/processor 375.

The communication manager 1932 includes a determination component 1940 that is configured to transmit, to the second node, a notification flag indicating one or more potentially skipped resources, the one or more potentially skipped resources being skipped by the first node at a beginning of the first set of UL or DL resources, where the transmitted UL or DL communication is based on the notification flag, e.g., as described in connection with step 1602 above. Determination component 1940 may also be configured to transmit, to a second node via a first set of uplink (UL) or downlink (DL) resources, UL or DL communication including at least one data packet, the first set of UL or DL resources allocated for a reception entity of the second node, e.g., as described in connection with step 1604 above. Determination component 1940 may also be configured to receive, from the second node, an acknowledgement (ACK) or negative ACK (NACK) based on the at least one data packet being decoded at the reception entity of the second node, e.g., as described in connection with step 1606 above.

The apparatus may include additional components that perform each of the blocks of the algorithm in the aforementioned flowcharts of FIGS. 13 and 16. As such, each block in the aforementioned flowcharts of FIGS. 13 and 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the baseband unit 1904, includes means for transmitting, to the second node, a notification flag indicating one or more potentially skipped resources, the one or more potentially skipped resources being skipped by the first node at a beginning of the first set of UL or DL resources, where the transmitted UL or DL communication is based on the notification flag. The apparatus 1902 may also include means for transmitting, to a second node via a first set of uplink (UL) or downlink (DL) resources, UL or DL communication including at least one data packet, the first set of UL or DL resources allocated for a reception entity of the second node. The apparatus 1902 may also include means for receiving, from the second node, an acknowledgement (ACK) or negative ACK (NACK) based on the at least one data packet being decoded at the reception entity of the second node. The aforementioned means may be one or more of the aforementioned components of the apparatus 1902 configured to perform the functions recited by the aforementioned means. As described supra, the apparatus 1902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 20:
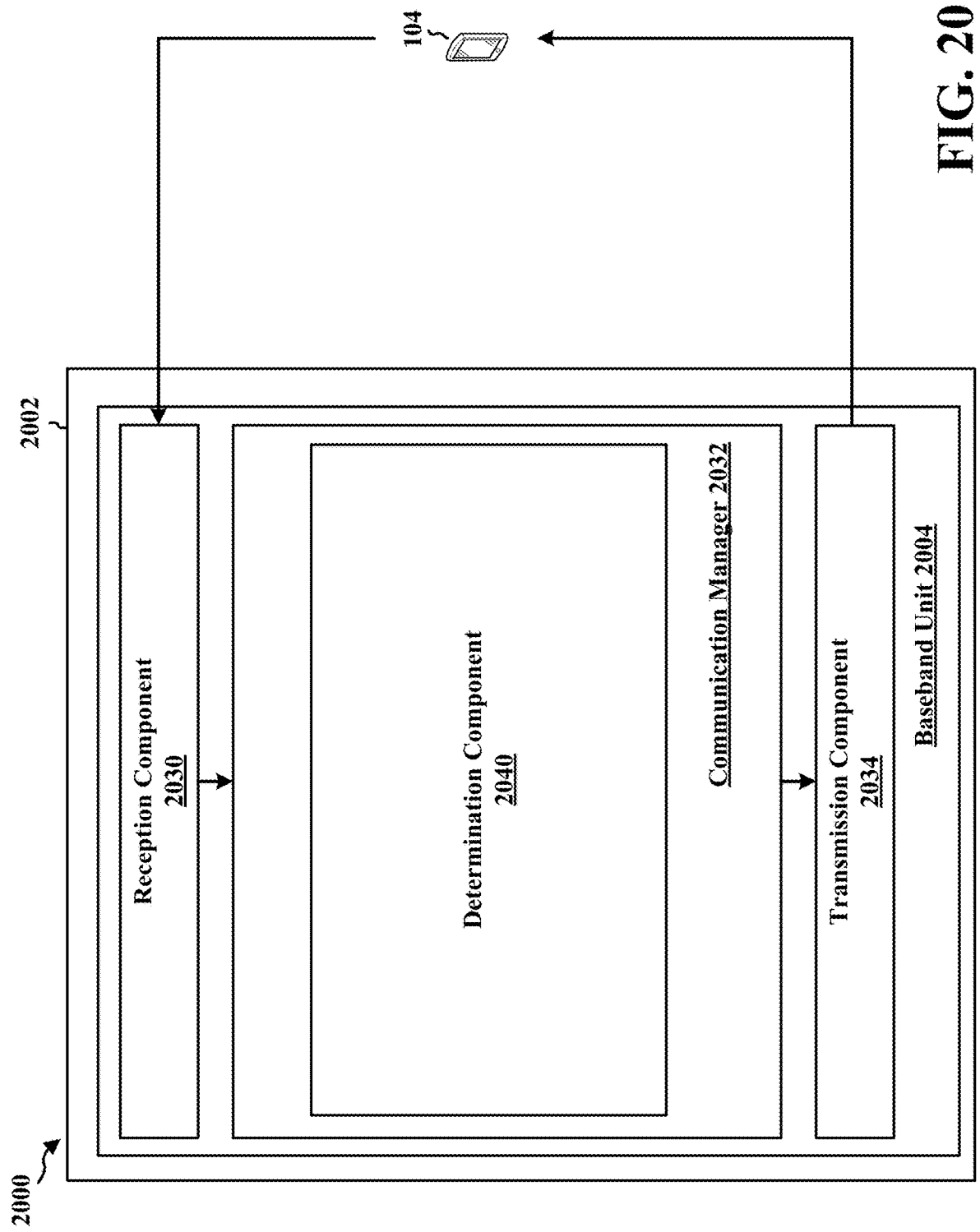
FIG. 20 is a diagram illustrating an example of a hardware implementation for an example apparatus.

FIG. 20 is a diagram 2000 illustrating an example of a hardware implementation for an apparatus 2002. The apparatus 2002 is a base station and includes a baseband unit 2004. The baseband unit 2004 may communicate through a cellular RF transceiver with the UE 104. The baseband unit 2004 may include a computer-readable medium/memory. The baseband unit 2004 is responsible for general processing, including the execution of software stored on the computer-readable medium/memory. The software, when executed by the baseband unit 2004, causes the baseband unit 2004 to perform the various functions described supra. The computer-readable medium/memory may also be used for storing data that is manipulated by the baseband unit 2004 when executing software. The baseband unit 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the baseband unit 2004. The baseband unit 2004 may be a component of the BS 310 and may include the memory 376 and/or at least one of the TX processor 316, the RX processor 370, and the controller/processor 375.

The communication manager 2032 includes a determination component 2040 that is configured to receive, from a second node, a notification flag indicating one or more potentially skipped resources, the one or more potentially skipped resources being skipped by a forwarding entity of the second node at a beginning of a first set of uplink (UL) or downlink (DL) resources, e.g., as described in connection with step 1702 above. Determination component 2040 may also be configured to receive, from the second node via the first set of UL or DL resources, the UL or DL communication including at least one data packet, the first set of UL or DL resources allocated for the forwarding entity of the second node, where at least one second resource of a second set of UL or DL resources overlaps with at least one first resource of the first set of UL or DL resources, e.g., as described in connection with step 1704 above.

The apparatus may include additional components that perform each of the blocks of the algorithm in the aforementioned flowcharts of FIGS. 13 and 17. As such, each block in the aforementioned flowcharts of FIGS. 13 and 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2002, and in particular the baseband unit 2004, includes means for receiving, from a second node, a notification flag indicating one or more potentially skipped resources, the one or more potentially skipped resources being skipped by a forwarding entity of the second node at a beginning of a first set of uplink (UL) or downlink (DL) resources. The apparatus 2002 may also include means for receiving, from the second node via the first set of UL or DL resources, the UL or DL communication including at least one data packet, the first set of UL or DL resources allocated for the forwarding entity of the second node, where at least one second resource of a second set of UL or DL resources overlaps with at least one first resource of the first set of UL or DL resources. The aforementioned means may be one or more of the aforementioned components of the apparatus 2002 configured to perform the functions recited by the aforementioned means. As described supra, the apparatus 2002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a node including at least one processor coupled to a memory and configured to: receive, via a first set of uplink (UL) or downlink (DL) resources, UL or DL communication including at least one data packet, the first set of UL or DL resources allocated for a reception entity of the node; decode, at the reception entity, the at least one data packet during a decoding period, the decoding period including a decoding start time and a decoding completion time; and transmit, via a second set of UL or DL resources, the UL or DL communication including the at least one data packet to a next hop node, the second set of UL or DL resources allocated for a forwarding entity of the node, at least one first resource of the first set of UL or DL resources overlapping with at least one second resource of the second set of UL or DL resources.

Aspect 2 is the apparatus of aspect 1, where the first set of UL or DL resources include one or more first repetition units and the second set of UL or DL resources include one or more second repetition units.

Aspect 3 is the apparatus of any of aspects 1 and 2, where an amount of the one or more first repetition units is different from an amount of the one or more second repetition units.

Aspect 4 is the apparatus of any of aspects 1 to 3, where the reception entity attempts to decode the at least one data packet upon reception of each of the one or more first repetition units, where the at least one processor is further configured to: stop reception of at least one remaining first repetition unit of the one or more first repetition units upon successfully decoding the at least one data packet, where the reception of the at least one remaining first repetition unit is stopped at an early termination instance.

Aspect 5 is the apparatus of any of aspects 1 to 4, where the at least one processor is further configured to: encode the at least one data packet at the forwarding entity of the node, the at least one data packet being transmitted to the next hop node via the one or more second repetition units after the at least one data packet is encoded, where the one or more second repetition units overlap with the at least one remaining first repetition unit.

Aspect 6 is the apparatus of any of aspects 1 to 5, where the node is an integrated access and backhaul (IAB) node associated with an IAB network, the reception entity corresponding to a mobile termination (MT) of the node or a distributed unit (DU) of the node, and the forwarding entity corresponding to the DU of the node or the MT of the node.

Aspect 7 is the apparatus of any of aspects 1 to 6, where the UL or DL communication is UL communication, the reception entity corresponding to the DU of the node and the forwarding entity corresponding to the MT of the node, the next hop node corresponding to a parent IAB node or an IAB donor.

Aspect 8 is the apparatus of any of aspects 1 to 7, where the UL or DL communication is DL communication, the reception entity corresponding to the MT of the node and the forwarding entity corresponding to the DU of the node, the next hop node corresponding to a child IAB node or a child user equipment (UE).

Aspect 9 is the apparatus of any of aspects 1 to 8, where the second set of UL or DL resources is allocated after the decoding completion time.

Aspect 10 is the apparatus of any of aspects 1 to 9, where the allocated second set of UL or DL resources overlap with one or more remaining first resources of the first set of UL or DL resources, the one or more remaining first resources not being used by the reception entity.

Aspect 11 is the apparatus of any of aspects 1 to 10, where the second set of UL or DL resources is allocated before the decoding completion time.

Aspect 12 is the apparatus of any of aspects 1 to 11, where the second set of UL or DL resources is allocated based on an assumption of an earliest possible decoding completion time.

Aspect 13 is the apparatus of any of aspects 1 to 12, where at least one second resource of the second set of UL or DL resources begins prior to the decoding completion time, the forwarding entity skipping the at least one second resource, where the forwarding entity transmits the at least one data packet to the next hop node via a portion of the second set of UL or DL resources that begins after the decoding completion time.

Aspect 14 is the apparatus of any of aspects 1 to 13, where the at least one processor is further configured to: transmit, to the next hop node, a notification flag indicating one or more potentially skipped resources, the one or more potentially skipped resources being skipped by the forwarding entity at a beginning of the second set of UL or DL resources.

Aspect 15 is the apparatus of any of aspects 1 to 14, where the at least one processor is further configured to: receive, from a last hop node, a notification flag indicating one or more potentially skipped resources, the one or more potentially skipped resources being skipped by the last hop node at a beginning of the first set of UL or DL resources, where the received UL or DL communication is based on the notification flag.

Aspect 16 is the apparatus of any of aspects 1 to 15, where, upon receiving the notification flag, the reception entity applies hypothesis testing on a starting location of a first resource of the first set of UL or DL resources, the first resource transmitted by the last hop node, the hypothesis testing being applied while receiving the UL or DL communication from the last hop node.

Aspect 17 is the apparatus of any of aspects 1 to 16, where, upon receiving the notification flag, the reception entity applies a pattern of redundancy version (RV) over one or more repetition resource units, the one or more repetition resource units being different when the notification flag is not received.

Aspect 18 is the apparatus of any of aspects 1 to 17, where the notification flag is received via a radio resource control (RRC) message or an F1 application protocol (F1-AP) message from an integrated access and backhaul (IAB) donor central unit (CU), or the notification flag is received via a medium access control (MAC) control element (MAC-CE) or downlink control information (DCI) from the last hop node.

Aspect 19 is the apparatus of any of aspects 1 to 18, where the last hop node is a parent node of the node for DL communication or a child node of the node for UL communication.

Aspect 20 is the apparatus of any of aspects 1 to 19, where a number of repetition transmissions performed by the forwarding entity is equal to a difference between a total number of allocated repetition units of the second set of UL or DL resources and a number of skipped repetition units before the decoding completion time.

Aspect 21 is the apparatus of any of aspects 1 to 20, where a number of repetition transmissions performed by the forwarding entity is equal to a fixed number.

Aspect 22 is the apparatus of any of aspects 1 to 21, where the fixed number is equal to a difference between a total number of allocated repetition units and a maximum number of skipped repetition units.

Aspect 23 is the apparatus of any of aspects 1 to 22, where the at least one processor is further configured to: transmit an acknowledgement (ACK) or negative ACK (NACK) upon decoding the at least one data packet at the reception entity of the node.

Aspect 24 is the apparatus of any of aspects 1 to 23, where the first set of UL or DL resources includes one or more first slots or mini-slots and the second set of UL or DL resources includes one or more second slots or mini-slots.

Aspect 25 is the apparatus of any of aspects 1 to 24, where the at least one data packet is associated with one or more data packet repetitions or one or more data packet retransmissions.

Aspect 26 is the apparatus of any of aspects 1 to 25, where at least one of the first set of UL or DL resources or the second set of UL or DL resources is configured via DL semi-persistent scheduling (SPS), configured via an UL configured grant, or scheduled via dynamic downlink control information (DCI).

Aspect 27 is the apparatus of any of aspects 1 to 26, further including a transceiver or an antenna coupled to the at least one processor.

Aspect 28 is an apparatus for wireless communication at a first node including at least one processor coupled to a memory and configured to: transmit, to a second node via a first set of uplink (UL) or downlink (DL) resources, UL or DL communication including at least one data packet, the first set of UL or DL resources allocated for a reception entity of the second node; and receive, from the second node, an acknowledgement (ACK) or negative ACK (NACK) based on the at least one data packet being decoded at the reception entity of the second node.

Aspect 29 is the apparatus of aspect 28, where the at least one processor is further configured to: transmit, to the second node, a notification flag indicating one or more potentially skipped resources, the one or more potentially skipped resources being skipped by the first node at a beginning of the first set of UL or DL resources, where the transmitted UL or DL communication is based on the notification flag.

Aspect 30 is an apparatus for wireless communication at a first node including at least one processor coupled to a memory and configured to: receive, from a second node, a notification flag indicating one or more potentially skipped resources, the one or more potentially skipped resources being skipped by a forwarding entity of the second node at a beginning of a first set of uplink (UL) or downlink (DL) resources; and receive, from the second node via the first set of UL or DL resources, the UL or DL communication including at least one data packet, the first set of UL or DL resources allocated for the forwarding entity of the second node, where at least one second resource of a second set of UL or DL resources overlaps with at least one first resource of the first set of UL or DL resources.

Aspect 31 is a method of wireless communication for implementing any of aspects 1 to 30.

Aspect 32 is an apparatus for wireless communication including means for implementing any of aspects 1 to 30.

Aspect 33 is a computer-readable medium storing computer executable code, where the code when executed by a processor causes the processor to implement any of aspects 1 to 30.

What is claimed is:

1. An apparatus for wireless communication at a node, comprising:
   a memory; and
   at least one processor coupled to the memory and configured to:
      receive, via a first set of uplink (UL) or downlink (DL) resources, UL or DL communication including at least one data packet, the first set of UL or DL resources allocated for a reception entity of the node;
      decode, at the reception entity, the at least one data packet during a decoding period, the decoding period including a decoding start time and a decoding completion time; and
      transmit, via a second set of UL or DL resources, the UL or DL communication including the at least one data packet to a next hop node, the second set of UL or DL resources allocated for a forwarding entity of the node, at least one first resource of the first set of UL or DL resources overlapping with at least one second resource of the second set of UL or DL resources.

2. The apparatus of claim 1, wherein the first set of UL or DL resources include one or more first repetition units and the second set of UL or DL resources include one or more second repetition units.

3. The apparatus of claim 2, wherein an amount of the one or more first repetition units is different from an amount of the one or more second repetition units.

4. The apparatus of claim 2, wherein the reception entity attempts to decode the at least one data packet upon reception of each of the one or more first repetition units, the at least one processor being further configured to:
   stop reception of at least one remaining first repetition unit of the one or more first repetition units upon successfully decoding the at least one data packet, wherein the reception of the at least one remaining first repetition unit is stopped at an early termination instance.

5. The apparatus of claim 4, wherein the at least one processor is further configured to:
   encode the at least one data packet at the forwarding entity of the node, the at least one data packet being transmitted to the next hop node via the one or more second repetition units after the at least one data packet is encoded, wherein the one or more second repetition units overlap with the at least one remaining first repetition unit.

6. The apparatus of claim 1, wherein the node is an integrated access and backhaul (IAB) node associated with an TAB network, the reception entity corresponding to a mobile termination (MT) of the node or a distributed unit (DU) of the node, and the forwarding entity corresponding to the DU of the node or the MT of the node.

7. The apparatus of claim 6, wherein the UL or DL communication is UL communication, the reception entity corresponding to the DU of the node and the forwarding entity corresponding to the MT of the node, the next hop node corresponding to a parent TAB node or an TAB donor.

8. The apparatus of claim 6, wherein the UL or DL communication is DL communication, the reception entity corresponding to the MT of the node and the forwarding entity corresponding to the DU of the node, the next hop node corresponding to a child TAB node or a child user equipment (UE).

9. The apparatus of claim 1, wherein the second set of UL or DL resources is allocated after the decoding completion time.

10. The apparatus of claim 9, wherein the second set of UL or DL resources overlap with one or more remaining first resources of the first set of UL or DL resources, the one or more remaining first resources not being used by the reception entity.

11. The apparatus of claim 1, wherein the second set of UL or DL resources is allocated before the decoding completion time.

12. The apparatus of claim 11, wherein the second set of UL or DL resources is allocated based on an assumption of an earliest possible decoding completion time.

13. The apparatus of claim 12, wherein the at least one second resource of the second set of UL or DL resources begins prior to the decoding completion time, the forwarding entity skipping the at least one second resource, wherein the forwarding entity transmits the at least one data packet to the next hop node via a portion of the second set of UL or DL resources that begins after the decoding completion time.

14. The apparatus of claim 13, wherein the at least one processor is further configured to:
   transmit, to the next hop node, a notification flag indicating one or more potentially skipped resources, the one or more potentially skipped resources being skipped by the forwarding entity at a beginning of the second set of UL or DL resources.

15. The apparatus of claim 13, wherein the at least one processor is further configured to:
   receive, from a last hop node, a notification flag indicating one or more potentially skipped resources, the one or more potentially skipped resources being skipped by the last hop node at a beginning of the first set of UL or DL resources, wherein the received UL or DL communication is based on the notification flag.

16. The apparatus of claim 15, wherein, upon receiving the notification flag, the reception entity applies hypothesis testing on a starting location of a first resource of the first set of UL or DL resources, the first resource transmitted by the last hop node, the hypothesis testing being applied while receiving the UL or DL communication from the last hop node.

17. The apparatus of claim 15, wherein, upon receiving the notification flag, the reception entity applies a pattern of redundancy version (RV) over one or more repetition resource units, the one or more repetition resource units being different when the notification flag is not received.

18. The apparatus of claim 15, wherein the notification flag is received via a radio resource control (RRC) message or an F1 application protocol (F1-AP) message from an integrated access and backhaul (TAB) donor central unit (CU), or the notification flag is received via a medium access control (MAC) control element (MAC-CE) or downlink control information (DCI) from the last hop node.

19. The apparatus of claim 15, wherein the last hop node is a parent node of the node for DL communication or a child node of the node for UL communication.

20. The apparatus of claim 13, wherein a number of repetition transmissions performed by the forwarding entity is equal to a difference between a total number of allocated repetition units of the second set of UL or DL resources and a number of skipped repetition units before the decoding completion time.

21. The apparatus of claim 13, wherein a number of repetition transmissions performed by the forwarding entity is equal to a fixed number.

22. The apparatus of claim 21, wherein the fixed number is equal to a difference between a total number of allocated repetition units and a maximum number of skipped repetition units.

23. The apparatus of claim 1, wherein the at least one processor is further configured to:
transmit an acknowledgement (ACK) or negative ACK (HACK) upon decoding the at least one data packet at the reception entity of the node.

24. The apparatus of claim 1, wherein the first set of UL or DL resources includes one or more first slots or mini-slots and the second set of UL or DL resources includes one or more second slots or mini-slots.

25. The apparatus of claim 1, wherein the at least one data packet is associated with one or more data packet repetitions or one or more data packet retransmissions.

26. The apparatus of claim 1, further comprising a transceiver or an antenna coupled to the at least one processor, wherein at least one of the first set of UL or DL resources or the second set of UL or DL resources is configured via DL semi-persistent scheduling (SPS), configured via an UL configured grant, or scheduled via dynamic downlink control information (DCI).

27. A method of wireless communication at a node, comprising:
receiving, via a first set of uplink (UL) or downlink (DL) resources, UL or DL communication including at least one data packet, the first set of UL or DL resources allocated for a reception entity of the node;
decoding, at the reception entity, the at least one data packet during a decoding period, the decoding period including a decoding start time and a decoding completion time; and
transmitting, via a second set of UL or DL resources, the UL or DL communication including the at least one data packet to a next hop node, the second set of UL or DL resources allocated for a forwarding entity of the node, at least one first resource of the first set of UL or DL resources overlapping with at least one second resource of the second set of UL or DL resources.

28. An apparatus for wireless communication at a first node, comprising:
a memory; and
at least one processor coupled to the memory and configured to:
transmit, to a second node via a first set of uplink (UL) or downlink (DL) resources, UL or DL communication including at least one data packet, the first set of UL or DL resources allocated for a reception entity of the second node; and
receive, from the second node, an acknowledgement (ACK) or negative ACK (NACK) based on the at least one data packet being decoded at the reception entity of the second node.

29. The apparatus of claim 28, wherein the at least one processor is further configured to:
transmit, to the second node, a notification flag indicating one or more potentially skipped resources, the one or more potentially skipped resources being skipped by the first node at a beginning of the first set of UL or DL resources, wherein the transmitted UL or DL communication is based on the notification flag.

30. An apparatus for wireless communication at a first node, comprising:
a memory; and
at least one processor coupled to the memory and configured to:
receive, from a second node, a notification flag indicating one or more potentially skipped resources, the one or more potentially skipped resources being skipped by a forwarding entity of the second node at a beginning of a first set of uplink (UL) or downlink (DL) resources; and
receive, from the second node via the first set of UL or DL resources, UL or DL communication including at least one data packet, the first set of UL or DL resources allocated for the forwarding entity of the second node, wherein at least one second resource of a second set of UL or DL resources overlaps at least one first resource of the first set of UL or DL resources.

* * * * *